(12) United States Patent
Blake

(10) Patent No.: US 6,206,060 B1
(45) Date of Patent: Mar. 27, 2001

(54) JIG SYSTEM FOR POSITIONING THE PLACEMENT OF MULTIPLE CUTS IN A WORKPIECE

(76) Inventor: F. Richard Blake, 133 Boxwood Cir., Hamburg, NY (US) 14075

( * ) Notice: Subject to any disclaimer, the term of this patent is extended or adjusted under 35 U.S.C. 154(b) by 0 days.

(21) Appl. No.: 09/257,464

(22) Filed: Feb. 24, 1999

(51) Int. Cl.[7] ........................................................ B27F 1/00
(52) U.S. Cl. .................. 144/87; 33/197; 33/638; 83/468.2; 83/468.6; 144/85; 144/135.2; 144/137; 144/144.1; 144/204.2; 144/371; 140/372; 269/303; 269/306; 269/315
(58) Field of Search ......................... 33/197, 638; 144/71, 144/82–87, 135.2, 136.1, 137, 144.51, 145.1, 145.2, 198, 200, 201, 204.2, 363, 371, 372, 144.1; 83/467.1, 468.2, 469.6; 264/303, 306, 315

(56) References Cited

U.S. PATENT DOCUMENTS

| | | |
|---|---|---|
| 663,645 | 12/1900 | Strait . |
| 751,121 | 2/1904 | Tidey . |
| 836,237 | 11/1906 | Bonte . |
| 869,309 | 10/1907 | Kramer . |
| 995,461 | 6/1911 | Holth . |
| 1,504,248 | 8/1924 | Johnson . |
| 1,583,964 | 5/1926 | Driggers . |
| 4,644,985 * | 2/1987 | Weaver .............................. 144/145.2 |
| 4,793,604 | 12/1988 | Taylor ................................... 269/303 |
| 5,195,730 | 3/1993 | Taylor ................................... 269/303 |
| 5,215,296 | 6/1993 | Adams et al. .......................... 269/60 |
| 5,458,171 * | 10/1995 | Ward ..................................... 144/85 |

* cited by examiner

*Primary Examiner*—W. Donald Bray
(74) *Attorney, Agent, or Firm*—Marianne Fuierer; Howard M. Ellis

(57) ABSTRACT

The present invention is a jig system for precisely positioning the placement of multiple cuts such as in the placement of dovetail or box joints cut in a wood panel. A row of multi-use adjustable spacers controls the indexing of a workpiece and can be used with a stationary and/or a portable cutting tool. The movability of the spacers permits a workpiece to be cut on both sides of a guide bar fence thereby assuring that the first cut will always be made on the same side of a drawer and will be esthetically pleasing regardless of the width of the workpiece. Additionally, the adjustability of the spacers accommodates any desired cutting tool height, angle and/or size. The jig system comprises: a stationary fixture; a spacer bar; a plurality of spacers engaged with the spacer bar, the spacers are adapted for lateral and rotational movement along the spacer bar thereby providing an engaged and non-engaged working mode; a sliding member adapted for lateral movement on the stationary fixture and for engaging at least one of the spacers in the engaged working mode; and means for holding the spacer bar and connecting the spacer bar to the stationary fixture while engaging with at least one of the spacers during the engaged working mode.

23 Claims, 20 Drawing Sheets

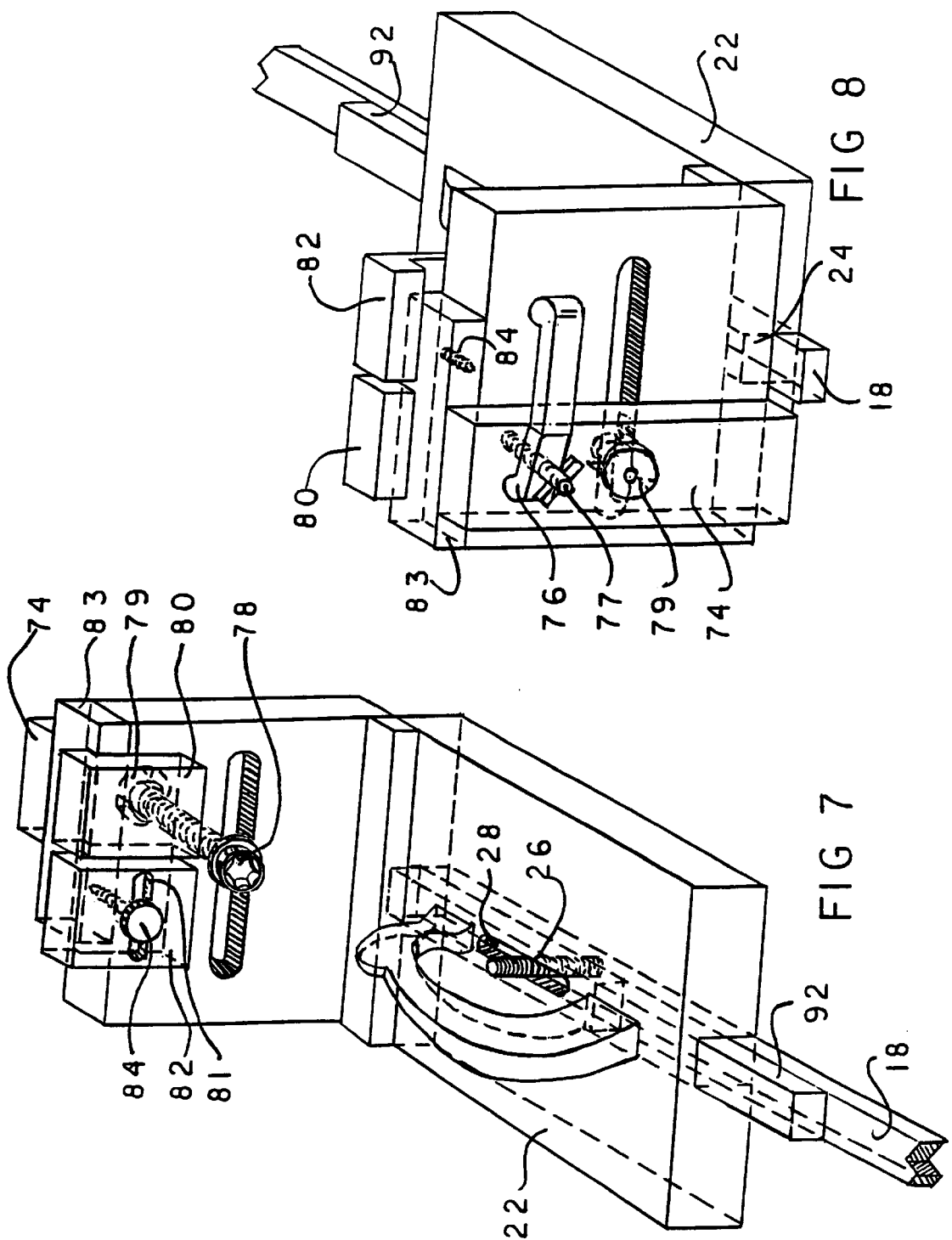

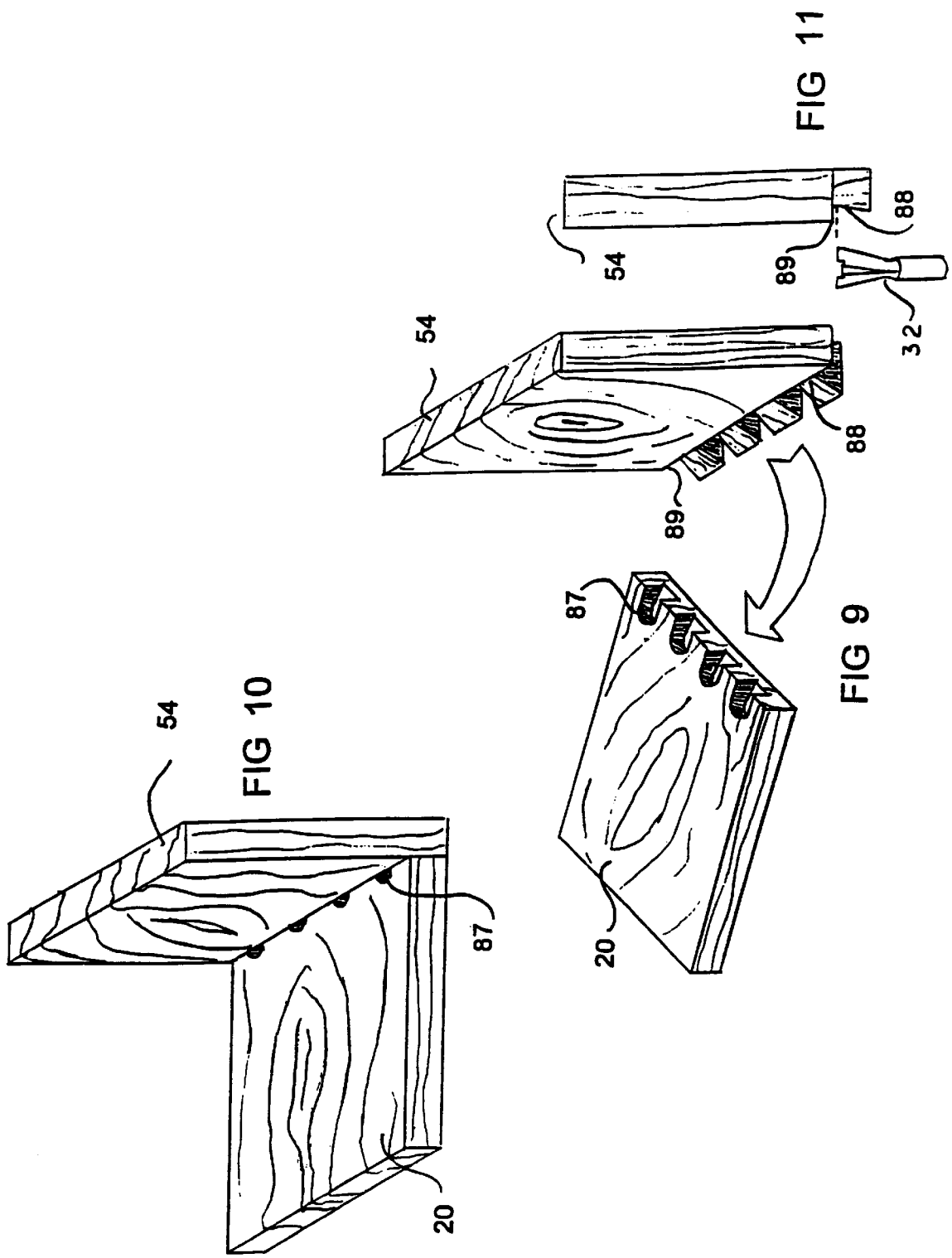

JIG SYSTEM FOR POSITIONING THE PLACEMENT OF MULTIPLE CUTS IN A WORKPIECE

FIELD OF INVENTION

This invention relates generally to the woodworking field and more specifically to a jig system for precisely positioning the placement of multiple cuts made with a cutting tool in a workpiece.

BACKGROUND OF THE INVENTION

Dovetail and box joints are well known methods for joining the side panels of wooden boxes or drawers to their front and back panels. This is accomplished by the use of interlocking joints cut into the ends of each panel where one joins to the other. The interlocking joints are ultimately held together by adhesives.

In ancient times, dovetail and box joints were laboriously cut by hand. Later, with the invention of the router, they were cut by a rotating cutting tool on a router. Cuts were evenly spaced on the ends of wood panels by employing templates which guided the cutter on a hand held router.

With the development of router tables, the router was able to be mounted in a fixed position. Now instead of the router being moved through a wooden panel or workpiece, the workpiece is moved into a stationary cutting tool.

The current state of the art for cutting dovetail and box joints includes jig systems that when secured to a router table help to guide a workpiece into the cutting tool of a router mounted into the table. The workpiece is guided against one side of a fence, which is part of the jig systems, as it is pushed into the cutting tool. The current technologies guide the fence after each cut. Subsequent cuts are then made at very precise locations equidistant from each other along the edge of the workpiece.

Currently, the indexing of the fence is controlled by two technologies. One method uses a lead screw which, when rotated, moves the fence away from the cutter a measured distance. The other technology utilizes a fence attached to one of two racks which face each other. They are held in position by meshing of interlocking teeth and moved a measured distance before each new cut.

These technologies, although improvements, create several problems. For instance, the movement of a fence by means of either racks or lead screws is controlled by templates or scales with graduated markings. As such, an operator must choose the correct scale or template and then precisely line up the graduations with a cursor after each cut is made with the router bit.

Another disadvantage of the present technologies lies in the problem created by the fact that the workpiece can only be presented to the cutting tool from one side of a fence. This is a serious shortcoming because to make a proper dovetail joint, both ends of the workpiece must be cut from the same relative starting point. When both ends of a workpiece are cut on the same side of the fence, as is the case with the current systems, the starting point for a series of joint cuts made on the ends of a drawer's front and/or back panel will be at different places. This results in a misalignment of joints when the drawer is assembled.

A still further disadvantage of the current systems lies in attempts to correct the problem presented by using only one side of a fence for guiding a workpiece. As stated earlier, alignment of the joints is difficult when using only one side of the fence. To overcome this problem, the current systems center the joint cuts on the workpiece. For instance, dovetail cuts are measured from the center of a workpiece out to both ends. As a result, this method restricts the widths of the drawer sides to only those which would permit dovetail cuts to fit completely within the confines of the workpiece. If the dovetail cuts do not fit completely into the confines of a drawer width then a hole can be seen on either end of the drawer side. Clearly, a hole that is visible on the top surface of a drawer side is unacceptable especially in a piece of furniture where fine workmanship is expected.

Another disadvantage of the present technologies includes the use of a plurality of fixed templates that require a specific cutting tool height. However, the accuracy of these systems is decreased by the difficulty encountered in accurately repeating the required placement height of the cutting tool in the router table.

A still further disadvantage of the present technologies includes the inability to use the exhaust port that exists in router table models that are currently available. As such, sawdust collection is not easily accomplished.

Accordingly, what is needed is a jig system that eliminates the cosmetic restrictions placed on the width of a workpiece wherein only certain widths are acceptable; the necessity to rely on one's ability to visually line up graduations on a cursor after each cutting; the plethora of single purpose templates and the inherent inaccuracy due to the difficulty of placing the cutting tool at an exact height in the router table.

SUMMARY OF INVENTION

For purposes of this invention, the terms and expressions below, appearing in the specification and claims, are intended to have the following meanings:

"Pins" as used herein means the front or back of a drawer or box.

"Rails" as used herein means the sides of a drawer or box.

The present invention provides for a jig system that overcomes the problems inherent in the current prior art by providing a row of multi-use adjustable spacers which eliminates the need to visually line up graduations on a cursor for each new cut. The adjustability of these spacers accommodates any desired cutting tool height or size without the need to accurately repeat the exact placement for a specific template. Additionally, the present invention permits a workpiece to be cut on both sides of a guide bar fence which eliminates the need for centering the workpiece.

Accordingly, a principal object of this invention is to provide a simplified and more complete jig system for cutting dovetail and box joints to be used with router tables which are currently available from commercial retailers.

Another object of the present invention is to provide a jig system comprising multi-use adjustable spacers that control the indexing of a workpiece and that can be used with a stationary and/or a portable cutting tool.

Still another object of the present invention is to provide a jig system that permits a workpiece to be cut on both sides of a guide bar fence thereby assuring that the first cut can be made on the same edge of the pin on either end of the pin. This guarantees the results will always be esthetically pleasing regardless of the width of the workpiece.

A further object of the present invention is to provide a jig system that is compatible with existing router tables and utilizes exhaust ports already built into most conventional router tables. Thus, sawdust produced can be quickly removed.

Yet another object of the present invention is to provide a simpler jig system to operate and manufacture. Since no expensive lead screw or rack technologies are utilized in the present invention, it can be produced more cost efficiently thereby bringing this new technology to a wider group of people at a lower price.

The foregoing objects are accomplished with a jig system mounted to a stationary fixture for positioning the placement of multiple cuts in a workpiece, the jig system comprising;
    a) a stationary fixture;
    b) a spacer bar;
    c) a plurality of spacers connecting to the spacer bar, the spacers are adapted for lateral and rotational movement along the spacer bar for positioning the spacers in an engaged and non-engaged working mode;
    d) a sliding member for engaging with the stationary fixture comprising:
        i) means for moving the sliding member laterally on the stationary fixture; and
        ii) means for contacting at least one of the spacers during the engaged working mode; and
    e) means for holding and for connecting the spacer bar to the stationary fixture while engaging at least one of the spacers in the engaged working mode.

The means for contacting at least one of the spacers during the engaged working mode may include an extension member attached to the sliding member having opposing surfaces that extend a sufficient length to make contact with at least one of the spacers during the engaged working mode. In a preferred embodiment, the extension member may be a guide bar fence having opposing work receiving surfaces for guiding the workpiece thereagainst when moving the workpiece into and away from the cutting tool.

In an alternative embodiment, when using the jig system with a portable cutting tool, the means for contacting at least one of the spacers during the engaged working mode may include an extension member having the configuration of a tab-like protrusion extending from the sliding member in the direction away from the cutting tool. The extension member may be a separate attachment or integral to the sliding member. The extension member is positioned transverse to the spacer bar and extends a sufficient length to contact at least one of the spacers during the engaged working mode. In this embodiment, the sliding member may further comprise a recess for accepting a cutting tool. The recess acts as an open area for receiving the cutting tool when moving the router bit into the workpiece.

A plurality of multi-use spacers are employed and each spacer may be adjustable or non-adjustable. It is the width or thickness of each spacer which controls the distance between cuts on a workpiece. The spacers have two modes, that being, the working and non-working mode. In a preferred embodiment, the spacers are a sufficient length so that in an engaged working mode they may be placed in an upright position resting against the stationary fixture. In the engaged working mode the spacers are contacting and/or positioned in snug engagement with each other and positioned between the extension member and the means for holding the spacers. The extension member engages one spacer at a time and after a cut is made in the workpiece the spacer is rotated and dropped out of position. The spacer can be retained in the dropped position or moved laterally to the other side of the spacer bar. The sliding member and the attached extension member can be moved laterally to take the place of the dropped spacer. The lateral movement of the sliding member, prior to the next cut, is automatically stopped at the correct place, as the extension member comes into contact with the remaining spacers positioned in the engaged working mode.

One of the advantages of the present invention over the current prior art is the elimination of tedious measuring of the appropriate distance the fence should be moved for the next cut because the critical distance the sliding member moves is not operator dependent, but predetermined by the width of the spacers.

The holding means also may function as holding and/or compressing the plurality of spacers against the extension member while engaging with at least one spacer. This stack of contacting spacers sandwiched between the extension member and means for holding prevents the lateral movement of the spacers on the spacer bar if pressure is applied to the extension member. The holding means has a sufficient surface area to maintain close contact to at least one of the spacers while positioned in the engaged working mode. The means for holding may be a cantilever or clamping system that attaches directly to the stationary fixture and may secure the spacer bar to the stationary fixture. It is desirable that the means for holding the spacer bar moves laterally along the spacer bar and the stationary fixture thereby providing an adjustable jig system dependent only upon the workpiece size and the amount of spacers that can fit on the spacer bar.

In another preferred embodiment, the means for holding and/or compressing the plurality of spacers against the extension member while engaging with at least one spacer does not function as means for holding the spacer bar. Instead, the spacer bar is secured directly to the stationary fixture at a distance that allows at least one of the spacers in an engaged working mode to engage with the means for holding.

The sliding member comprises a surface which may be positioned above or below a workpiece depending on the type of cutting tool. When using a stabilized cutting tool mounted in a router table, the sliding member moves laterally on the stationary fixture and is positioned below the workpiece thereby providing a surface for the workpiece to be placed upon.

It is further envisioned by this inventor to use a portable cutting tool, such as a router or plunge router (with a stabilized bit) that is moved into a workpiece secured to a stationary fixture. In this embodiment, the sliding member is positioned above the workpiece and suspended from a stationary fixture by at least one means for moving laterally on the stationary fixture. The stationary fixture may further comprise a bridging structure whereon the sliding member moves laterally by hooks or ear-like supports secured to the sliding member and which attach to the bridging supports. The portable cutting tool is introduced into a recess on the sliding member which accepts the cutting tool. After a cut is made, the portable router is removed from the workpiece, the spacer next to the extension member is dropped and the sliding member is moved laterally on the bridging support to engage with the next spacer.

Interlocking joints whether dovetail or box joints are made by cutting out portions on the end of one workpiece so that they fit into similar mating cuts made on the end of a second workpiece. In some applications, such as making half-blind dovetail and box joints on drawer fronts, the cuts will be made by positioning the workpiece horizontally on the sliding member and moving it into a stationary cutting tool. As a result, the joints will be visible from only one side. For other applications, such as through dovetail and box joints where the joints are visible from two sides, the workpiece may be clamped in a vertical position and moved into the stationary cutting tool. This vertical positioning of the workpiece is facilitated by securing the workpiece to a miter slide which movably engages with the guide bar fence and moves into and away from the cutting tool.

The present jig system provides significant advantages over prior art systems because the workpiece may be cut on both sides of the guide bar fence when required. Therefore, no centering of the workpiece is necessary and the first dovetail cut will always be made on the same edge of the a drawer pin. One end of a workpiece can be cut on the one side of the guide bar fence and the opposite end of the workpiece can be cut on the other side of the guide bar fence, and in both cases the same edge of the drawer pin receives the first cut.

Further advantages of the invention will be readily apparent from the following detailed description, taken in conjunction with the annexed sheets of drawings on which is illustrated several preferred embodiments of the invention.

BRIEF DESCRIPTION OF THE DRAWINGS

FIG. 7 is an enlarged illustration showing the miter slide and the components which enable the miter slide fence to be aligned.

FIG. 8 is an enlarged illustration showing the rear view of the miter slide shown in FIG. 7.

FIG. 9 is an illustration showing the dovetail cuts on a rail (drawer side) and a pin (drawer front).

FIG. 10 is an illustration showing how the dovetail rail cuts fit into the corresponding dovetail pin cuts.

FIG. 11 is a side view illustration showing how a cutting tool cuts a rabbet in a workpiece.

DETAILED DESCRIPTION OF THE INVENTION

In the description which follows like parts are marked similarly throughout the specification and drawings. The drawings are not necessarily to scale and in some instances proportions have been exaggerated in order to more clearly depict certain features of the invention.

Figure 1:
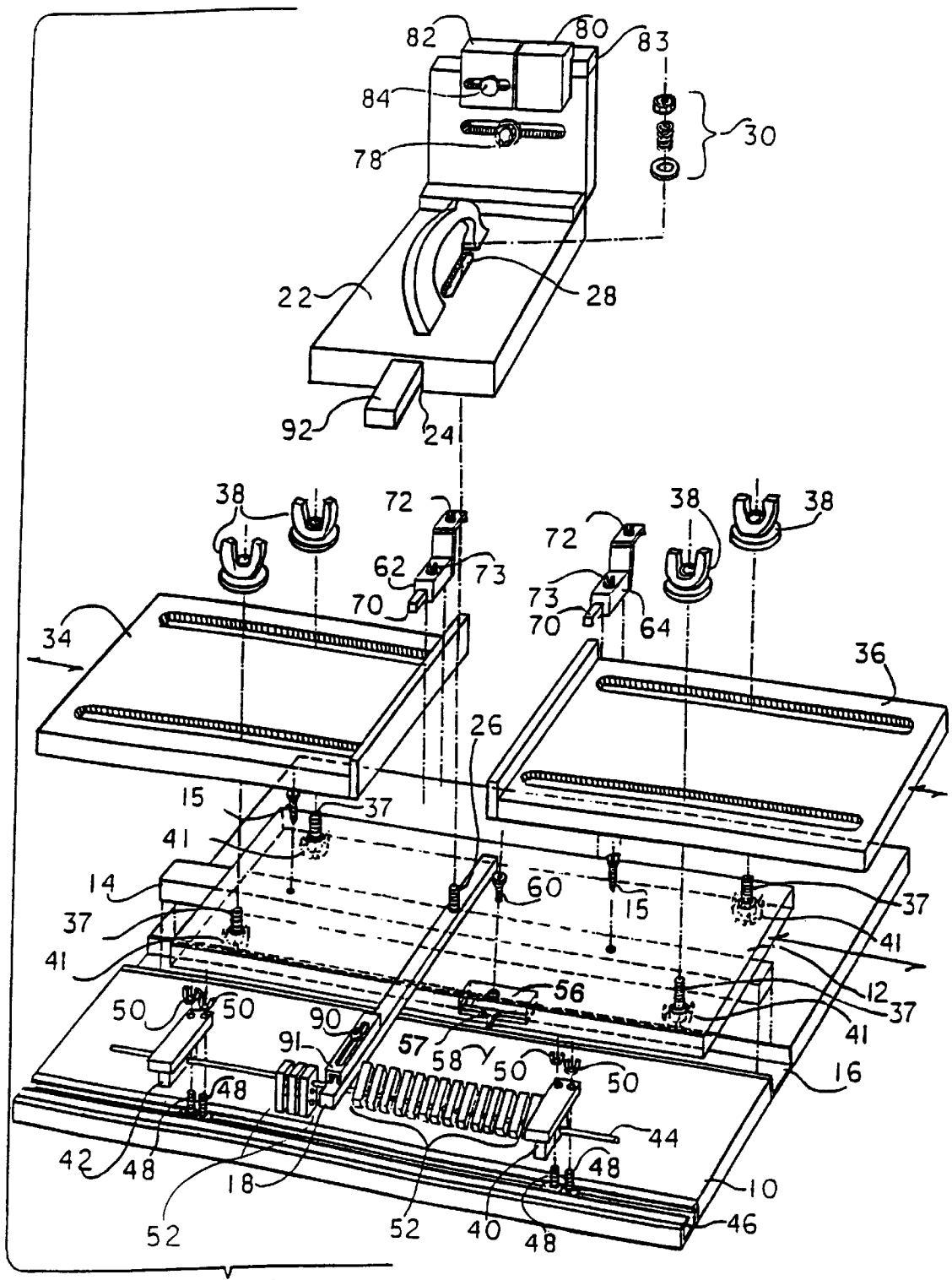
FIG. 1 is an exploded perspective view of the complete assembly of the jig system adapted for a router table having a stationary cutting tool.
Figure 2:
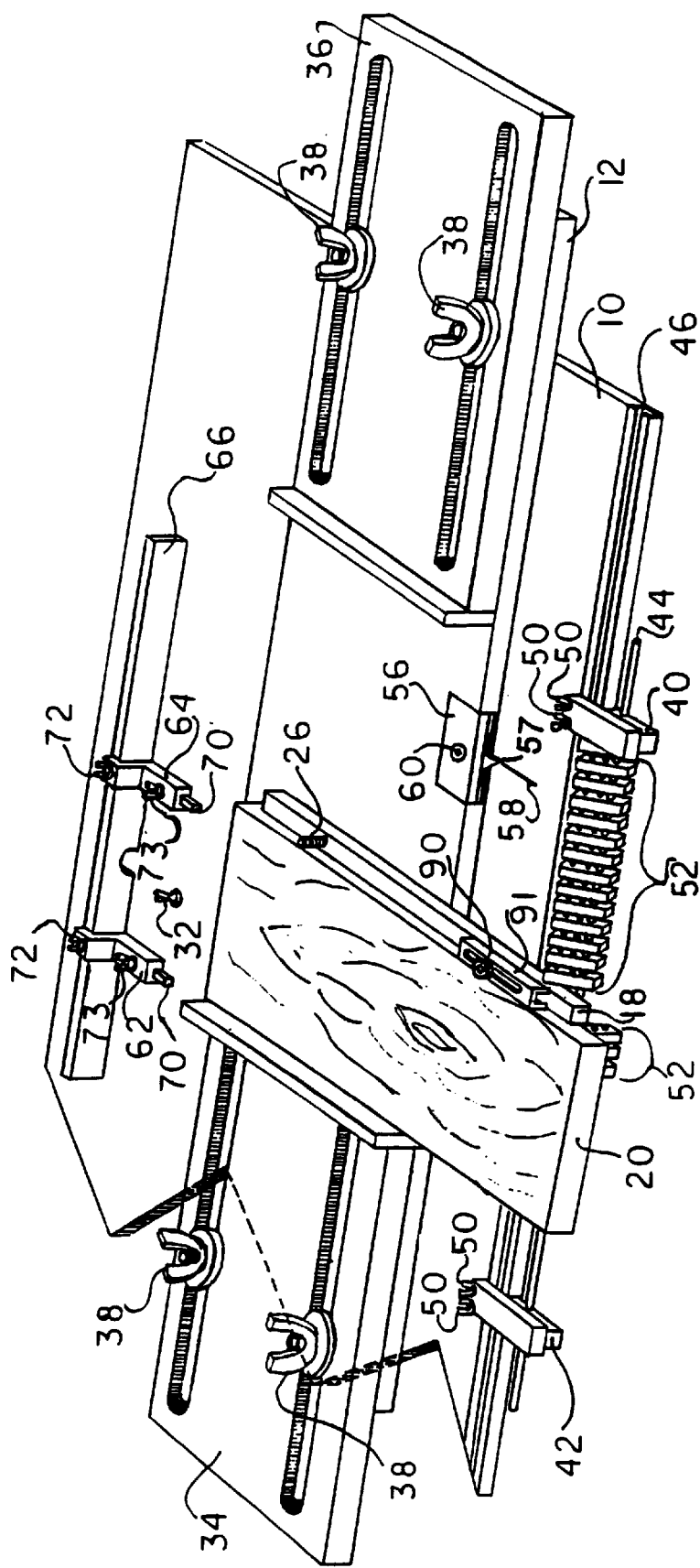
FIG. 2 is a perspective view illustrating use of the jig system for positioning a workpiece on one side of the guide bar fence.
Figure 3:
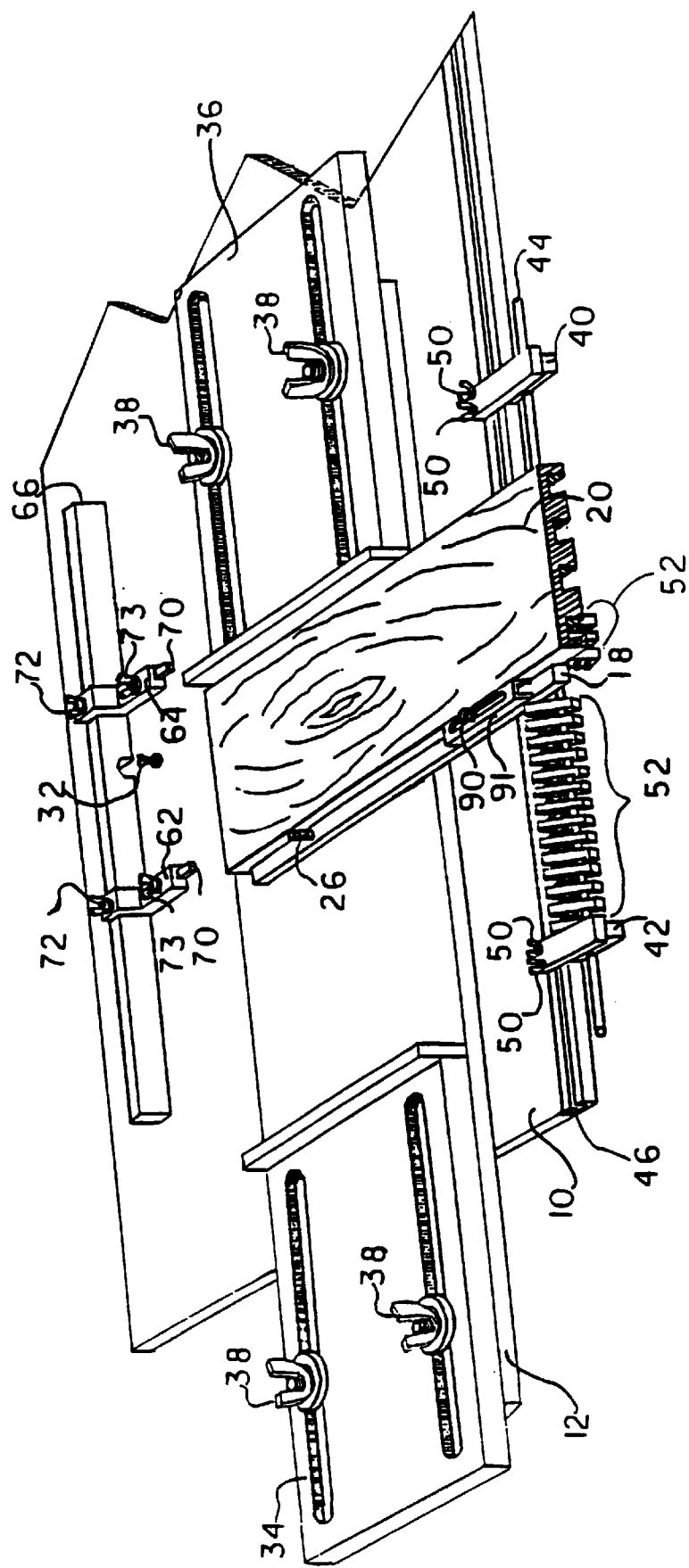
FIG. 3 is a perspective view illustrating use of the jig system for positioning the opposite end of the same workpiece shown in FIG. 2 on the opposing side of the guide bar fence.

FIGS. 1, 2, 3 show a stationary fixture 10, which in this embodiment may be a router table having a miter slot 16 which engages with a sliding member 12. The sliding member 12, is a surface that accepts a workpiece 20, in this embodiment, and is adapted for laterally movement on the router table 10. The sliding member 12 can be made of any hard material including plywood, plastic, various particle boards, and metal. The sliding member engages with the router table 10 by means for moving laterally on the stationary fixture which in this embodiment is a runner 14. The runner 14 is screwed to the under side of the sliding member 12 with screws 15. It may be fabricated from any durable material that will permit easy slidability in the miter slot 16. Preferably, the material includes delron, nylon, or even metal, and more preferably an ultra high molecular weight plastic. The runner 14 fits into the router table miter slot 16 thereby providing for lateral movement on the stationary fixture.

The sliding member 12 further comprises means for contacting at least one spacer 52 in an engaged working mode which is extension member 18. In this embodiment the extension member is a guide bar fence 18, which is permanently fastened to the sliding member 12. The guide bar fence is multi-functional in this embodiment. It provides a surface that contacts an engaged working mode spacer 52 for determining the positioning of the workpiece 20 relative to a cutting tool 32; it is used as a fence to guide the workpiece 20 as shown in place on FIGS. 2 and 3 and is also used as a support for a miter slide 22 to move on as shown in FIG. 1, 4, 7, 8, and 12.

Viewing FIG. 1, opposing vice jaws 34 and 36 are each secured to the sliding member 12 by means of a locking wing nut and washer 38 thread onto locking bolt 37. Locking bolt 37 is fastened to the sliding member 12 by "T" nut 41 shown in phantom. The opposing vice jaws 34 and 36 slide laterally towards the guide bar fence 18 and are used to compress workpiece 20 against the guide bar fence 18 when the workpiece 20 is being cut on either side of the guide bar fence 18.

The guide bar fence 18 is transverse to a spacer bar 44, and preferably, perpendicular to the spacer bar. The spacer bar 44, as shown in FIGS. 1, 2, 3 and 4 engages with and holds a plurality of spacers 52. The configuration of the spacer bar may be circular or any geometric shape. The spacers are connected or fastened by any means as long as the spacers can move laterally on the spacer bar and can rotate or pivot thereon. The rotation or pivoting of each individual spacer provides both a working mode and a non-working mode. When the spacers 52 are positioned in an upright position, that being rising above the router table and resting thereon, they are in a working mode and engage with the guide bar fence 18 thereby preventing any further movement of the sliding member 12. This stopping of sliding member 12 allows for workpiece 20 in FIGS. 2 and 3, or a workpiece 54 in FIG. 4 to be correctly positioned in relation to the cutting tool 32 as the workpieces 20 and 54 are moved into the cutting tool and drawn back. It should be noted that the spacers whether in an engaged working mode or non-working mode do not contact the workpiece directly but instead the spacers contact only the extension member which in turn directs the positioning of the workpiece.

Figure 5:
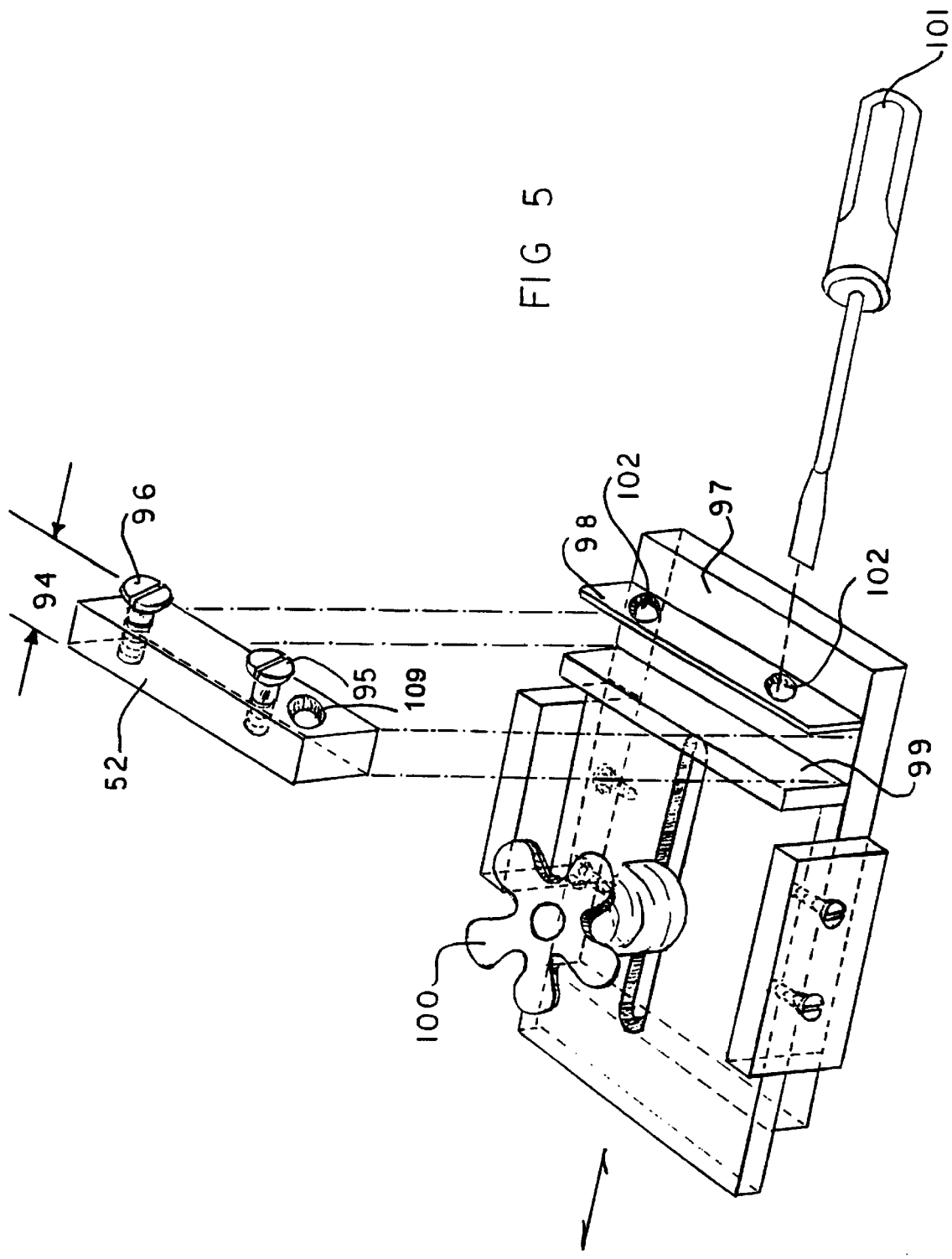
FIG. 5 is an enlarged view showing the configuration of an adjustable spacer and the spacer setting jig.
Figure 15:
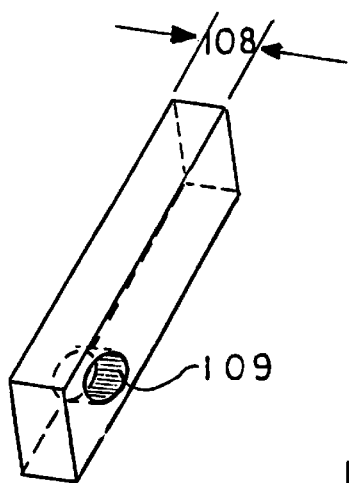
FIG. 15 is an illustration of a non-adjustable spacer having a predetermined width.
Figure 16:
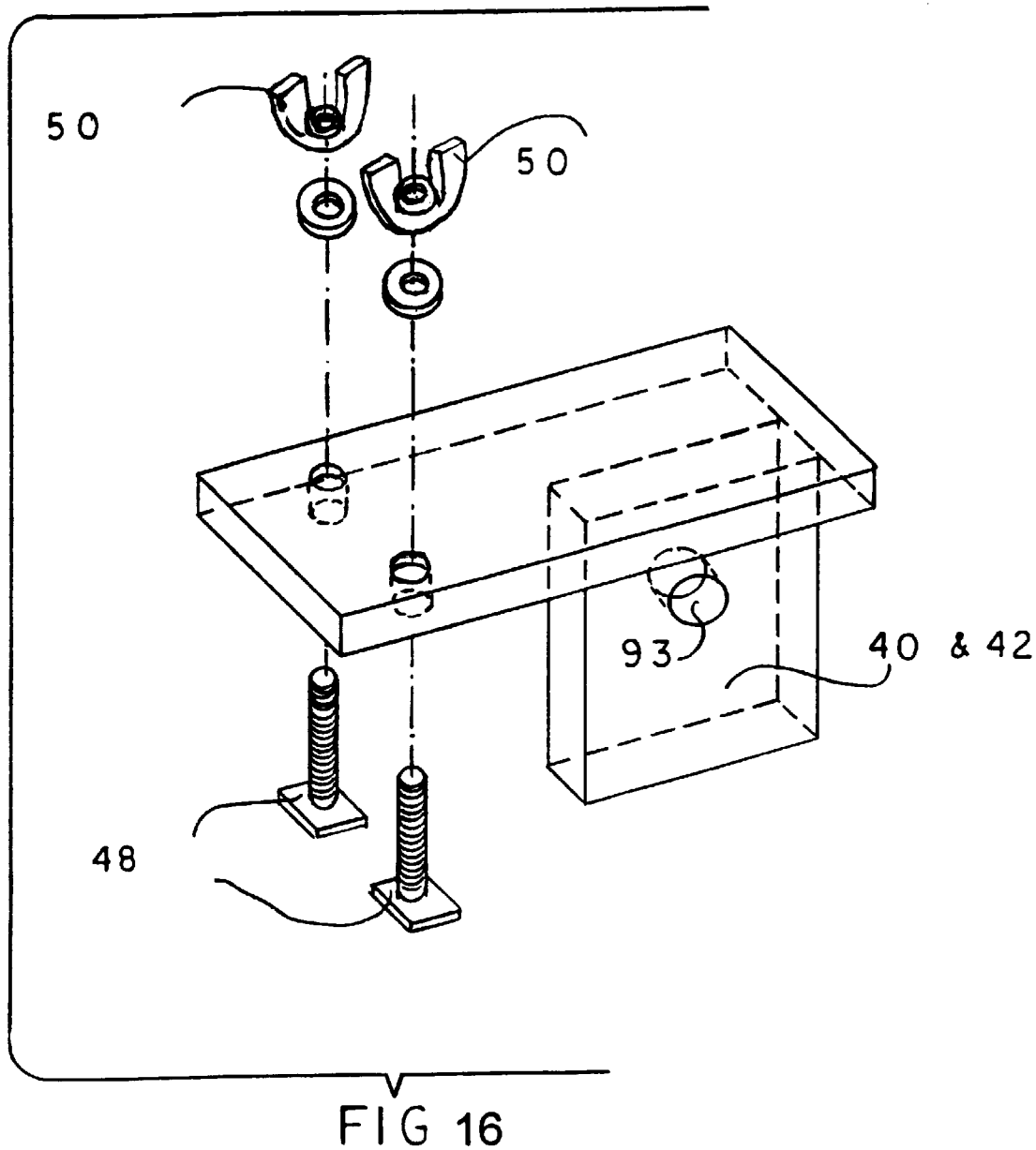
FIG. 16 is an exploded view illustrating a spacer bar cantilever which attaches to a "T" slide on a router table.

The spacer 52 may be adjustable as shown in FIG. 5 or have a predetermined width as shown in FIG. 15 which is dependent upon the cutting tool type, size and the height of the cutting tool 32 in the router table 10.

After completing the cutting of the workpiece 20, such as shown in FIG. 2, on the left of the guide bar fence 18 it may be necessary to cut the opposite end of the same workpiece 20 on the right of the guide bar fence 18 as shown in FIG. 3. To make the switch, all the spacers 52 that still remain in the engaged working mode are dropped and moved out of the engaged working mode position such as shown in FIGS. 1 and 2, and then moved laterally under the guide bar fence 18 and raised into the engaged working mode position on the left of the guide bar fence 18 as shown in FIG. 3. Thus, the plurality of spacers 52 will be able to control the movement of the sliding member 12 for those operations requiring the opposite end of the workpiece 20 to be cut on the right of the guide bar fence 18 as shown in FIG. 3.

The guide bar fence 18 may be positioned above or below the spacer bar 44 depending on the position of the spacers during the engaged working mode. The spacers may rest on the top surface of the router table in the working mode and dropped by the force of gravity to the non-working mode so that the sliding member can be moved laterally to index the next cut when the guide bar fence engages with the next spacer in an engaged working mode. Alternatively, the spacers may be positioned below the spacer bar in the working mode and moved into an upright position in a non-working mode. Accordingly, the extension member, that being the guide bar fence would be positioned below the spacer bar.

In this embodiment, the spacer bar 44 is held and secured to the router table 10 by means for holding the spacer bar which also firmly holds the plurality of contacting spacers in a working mode against the guide bar fence 18. Any device capable of stabilizing the spacer bar 44 and connecting same to the router table 10 while engaging with the plurality of spacers 52 may be used in the present invention. Preferably, any type of clamp or cantilever may be used to secure the spacer bar 44 to the router table. Shown in FIGS. 1,2 and 3 cantilevers 40 and 42 are affixed to a "T" slide 46 by means of the "T" slide bolts 48 and cantilever locking nuts 50. As such, cantilevers 40 and 42 are laterally movable on both the spacer bar and the router table thereby stabilizing the plurality of contacting spacers when the spacers are in an engaged working mode. Additionally, because the placement of the cantilever engages with at least one spacer and holds the plurality of spacers in a stable and vertical position there is a reduction of lateral movement of the spacers. As a result, the present system provides greater accuracy in positioning and cutting of joints, in that, pressure applied to the workpiece for guiding against the guide bar fence does not cause lateral movement in the spacers which could cause unnecessary movement in the workpiece and transfer into a loss of accuracy in placement of the cuts.

As stated earlier, the width or thickness of individual spacers 52 may be adjusted to the desired thickness 94 in the spacer setting jig as shown in FIG. 5. Spacer 52 comprises adjustable screws that may be used to change the thickness of the spacer. Two metal screws 95 and 96 are threaded into the spacers as shown in FIG. 5. A hole 109 is provided at one end of the spacer 52 as a means for mounting the spacer on the spacer bar 44.

Figures 13, 14:
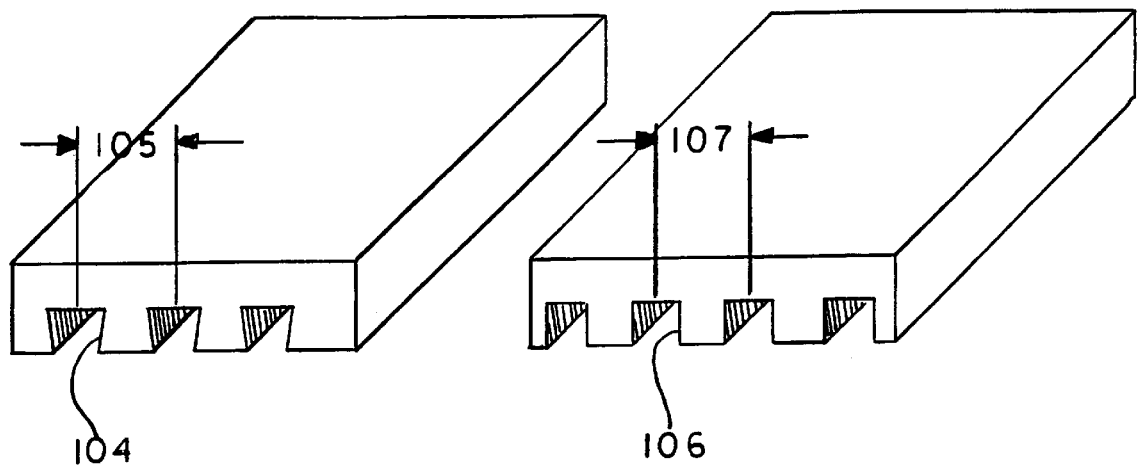
FIG. 13 is an illustration of a dovetail joint.
FIG. 14 is an illustration of a box joint.

The proper spacer thickness 94 is determined by the center to center distance between dovetail or box joint cuts as shown in FIGS. 13 and 14, see 105 and 107, respectively. Determining the thickness setting 94 of the adjustable spacer for a dovetail joint is dependent upon the depth of cut into the edge of the workpiece, the diameter of the cutting tool and wall angle 104 all of which determine the center to center distance 105 between cuts.

In the case of box joints, shown in FIG. 14, the side walls 106 are perpendicular because a straight cutting tool is used. In this regard, as long as the diameter of the cutting tool is not changed, the center to center distance 107 between cuts does not change regardless of the depth of the cut.

It becomes obvious in the manufacture of box joints that the diameter of the cutter alone determines the thickness of the spacer. As such, this fact leaves the option of using adjustable spacers 52 as shown in FIG. 5 or nonadjustable spacers with a specific thickness such as shown in FIG. 15. The spacer thickness 108 in FIG. 15 is a product of two times the cutter tool diameter and is not dependant on anything else. When in use, the nonadjustable spacer replaces the adjustable spacers and is mounted on the spacer bar 44 by means of the mounting hole 109.

Spacer setting jig 97 shown in FIG. 5, is used in setting the adjustable spacers 52. In this regard, it acts like a feeler gauge. First, the distance between the stationary front jaw 98 and the adjustable back jaw 99 is set to equal the center to center distance between dovetail or box joint cuts. Once this is measured and the distance between the jaws is set to match the measurement, the adjustable back jaw 99 is locked in position by tightening the jig locking knob 100.

An adjustable spacer 52 is placed between the front jaw 98 and the back jaw 99 of the spacer setting jig with the alignment screws 95 and 96 in contact with the alignment holes 102.

A screwdriver 101 is placed in the alignment holes 102 to tighten or loosen the alignment screws as necessary. The adjustment is determined by moving the adjustable spacer 52 up and down between the jaws 98 and 99 and feeling the tightness or lack of tightness as the screws are adjusted with screwdriver 101. The first screw closest to the mounting hole 109 is the alignment screw 95. Its purpose is to help keep the spacers aligned in an even row during use. The setting of the alignment screw 95 is not as critical as the second screw, but it may not exceed the center to center distance between dovetail or box joint cuts. The second screw is the dimension screw 96. It is adjusted precisely to equal the center to center distance between cuts with an allowable tolerance of about ±0.005 in.

Figure 26:
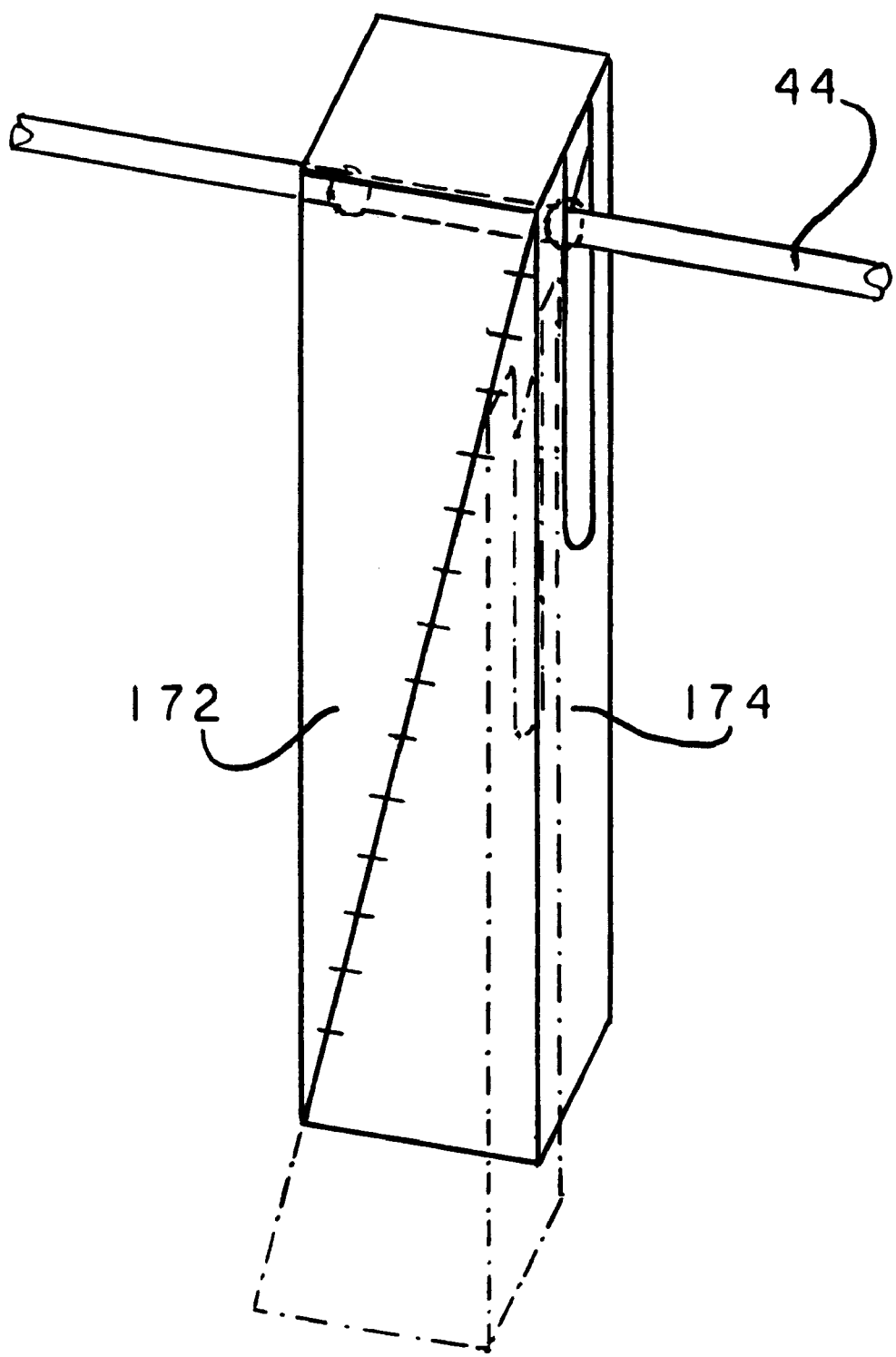
FIG. 26 is an illustration showing an alternative adjustable spacer.

In addition, the spacers may be so constructed that adjustment may be achieved by the example illustrated in FIG. 26.

The spacers may comprise two wedge-shaped pieces 172 and 174 that slidably engage with each other. The placement of the wedges in relationship to each other will determine the size of the spacers. At least one of the wedges will have means for detaching from the spacer bar and moving along the longitudinal axis of the other wedge. The wedges can be delineated with graduations that when properly adjusted will correspond to the size of the cutting tool being used or the desired width of the spacers.

Figure 6:
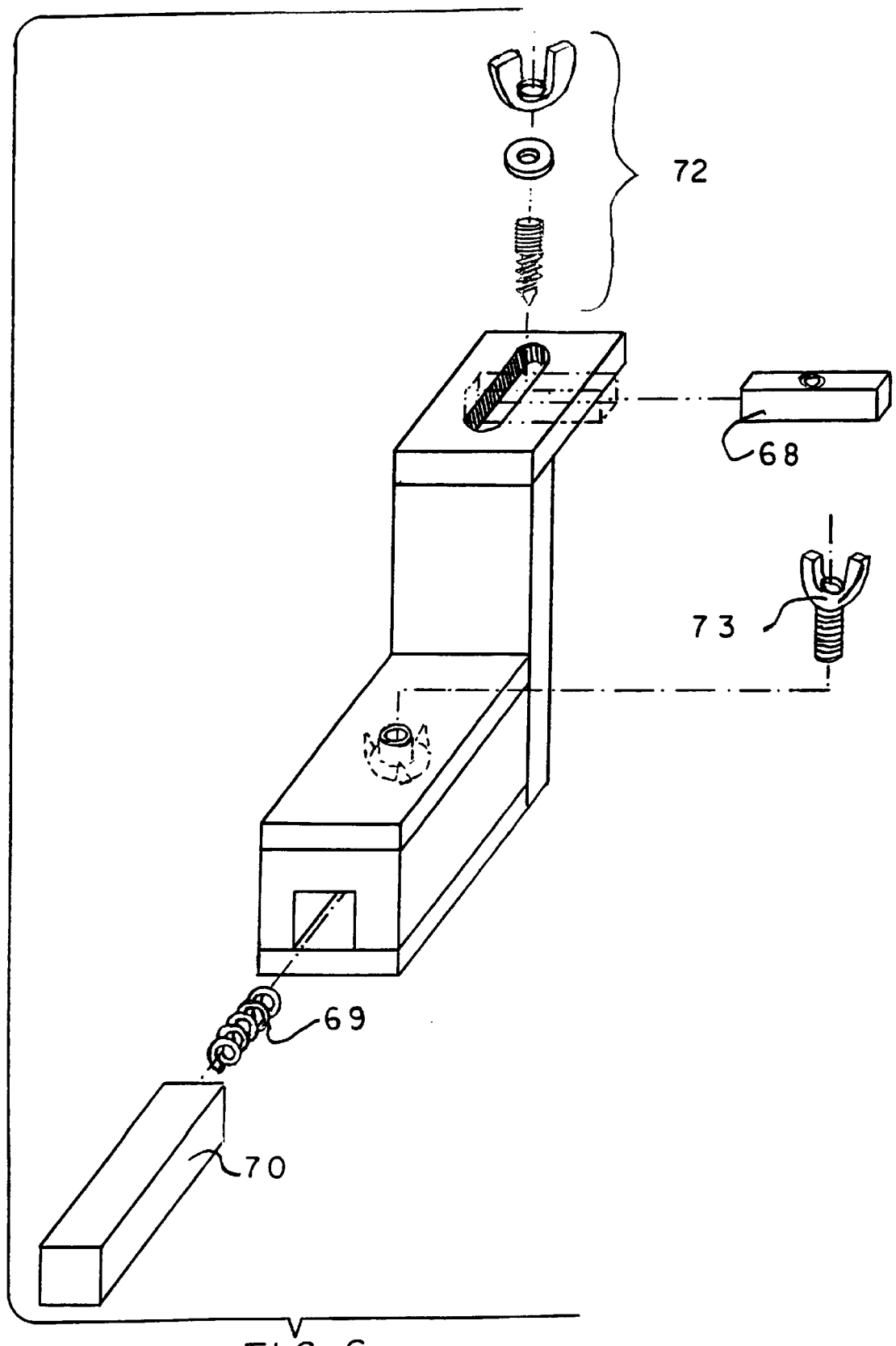
FIG. 6 is an exploded view which illustrates the adjustable back stops with spring loaded plunger.

Hidden dovetails joints are used mainly on drawer fronts so that the face of the drawer shows no evidence of the dovetail joints. For hidden dovetail joints, the pin cuts are made with the drawer fronts being placed on the sliding member 12 and moved into the cutting tool. However, it is necessary to regulate the distance that the pin is moved into the cutting tool. This is accomplished in the present invention by back stops 62 and 64 which are held to a router table fence 66 and shown individually in FIGS. 2,3, and 6. The back stops are held in place by back stop clamps 68, as shown in FIG. 6. The backstop clamps 68 are secured by locking assembly 72. Backstops are only used when the workpiece is positioned horizontally on the sliding member 12 as in FIGS. 2 and 3. Spring loaded plungers 70 are propelled forward by coil spring 69 as shown in FIG. 6. When the spring loaded plungers are set on a router table, they determine the distance that the workpiece 20 will move into the cutting tool 32 once the workpiece makes initial contact with the cutting tool. Therefore, the spring loaded plungers determine the depth of the cut. Once the workpiece 20 makes contact with either spring-loaded plunger 70, further movement of the workpiece into the cutting tool 32 is stopped.

Spring loaded plungers 70 are set during the initial set up of the jig system and are locked in position by locking screw and wing nut 73.

Figure 18:
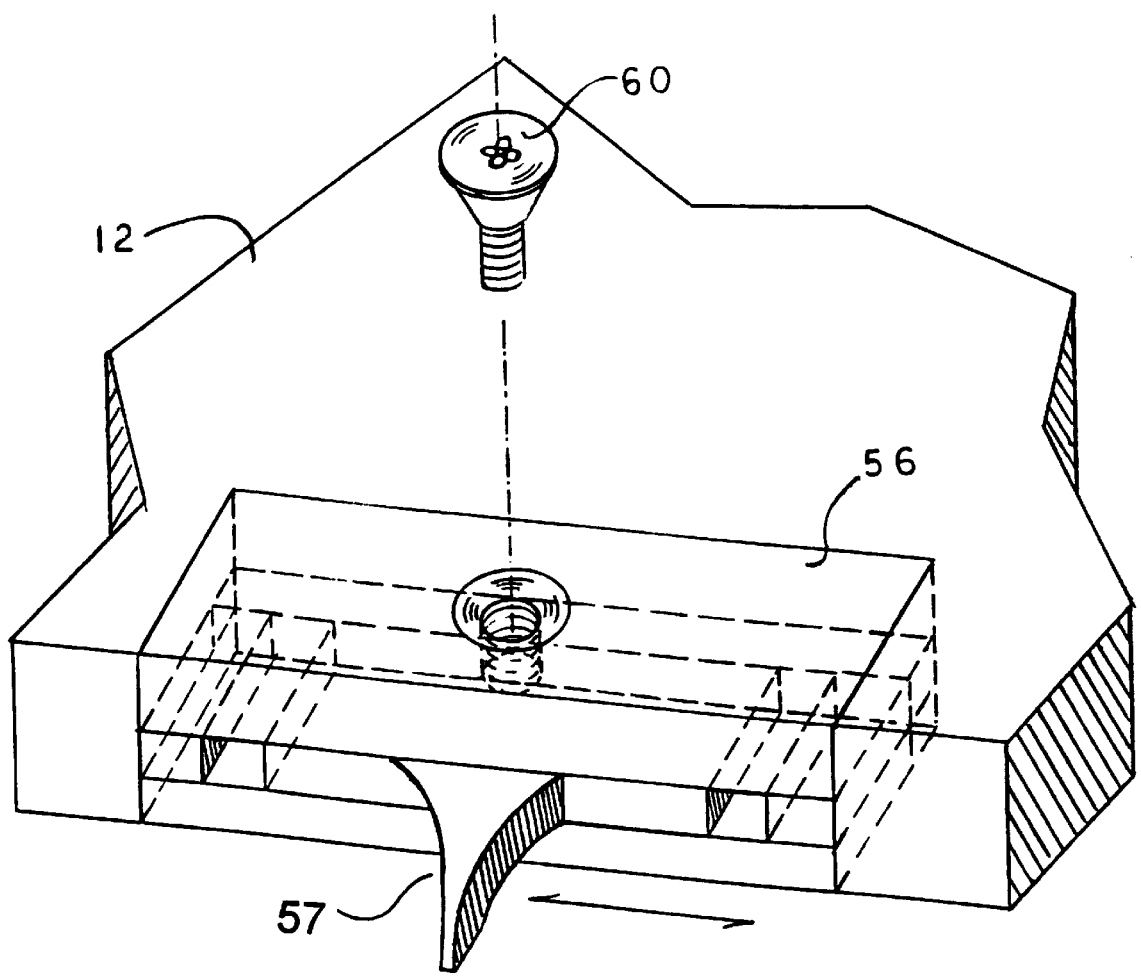
FIG. 18 is an enlarged view of the centering device shown in FIG. 1 and FIG. 2.

The centering guide 56 is shown in FIGS. 1 and 2 and in greater detail in FIG. 18. It is used to center the sliding member 12 on the center of the cutting tool 32. Briefly, this is accomplished in the present embodiment by lining up the center of the sliding member with the center of the cutting tool and then clamping the sliding member to the router table 10. The workpiece 20 is placed on the sliding member 12, such as shown in FIG. 2. A number of spacers are selected which when combined form a row that is wider than the workpiece. The spacers are rotated upright into an engaged working mode to rest on the router table. The spacers are compressed between the guide bar fence 18 and the end cantilever 40 and the cantilever is locked into place by tightening nut 50. Next, all the spacers are moved to the other side of the guide bar fence and compressed between the guide bar fence 18 and end cantilever 42 which is locked into place as shown in FIG. 3. The sliding member 12 is now roughly centered on the cutting tool 32.

More precise centering involves sliding pointer 57 to the center of the guide 56 and locking with set screw 60 as shown in FIG. 2. A line 58 is marked on the router table and the sliding member is unclamped and ready to make a cut. The next step involves making several cuts in the workpiece. The first cut is made with the spacers engaging one side of the guide bar fence 18 such as the setup in FIG. 2 and then another workpiece is cut using the setup of FIG. 3. The cuts are matched and the distance between the beginning of the cuts and the workpiece edge contacting the fence determines if further centering is needed. If the distances match then the centering is complete. However, if there is a difference in the distance in the two workpieces, this difference is divided by 2 and the sliding member 12 must be adjusted by this amount. The sliding member 12 is moved the appropriate distance from the pencil line 58 and then the cursor arrow 57 is relocated to line up with the penciled line 58. When the sliding member 12 is perfectly centered on the cutting tool, the centering guide 56 and arrow 57 are lined up on the center line 58 and locked in place by the centering guide locking screw 60.

Figure 4:
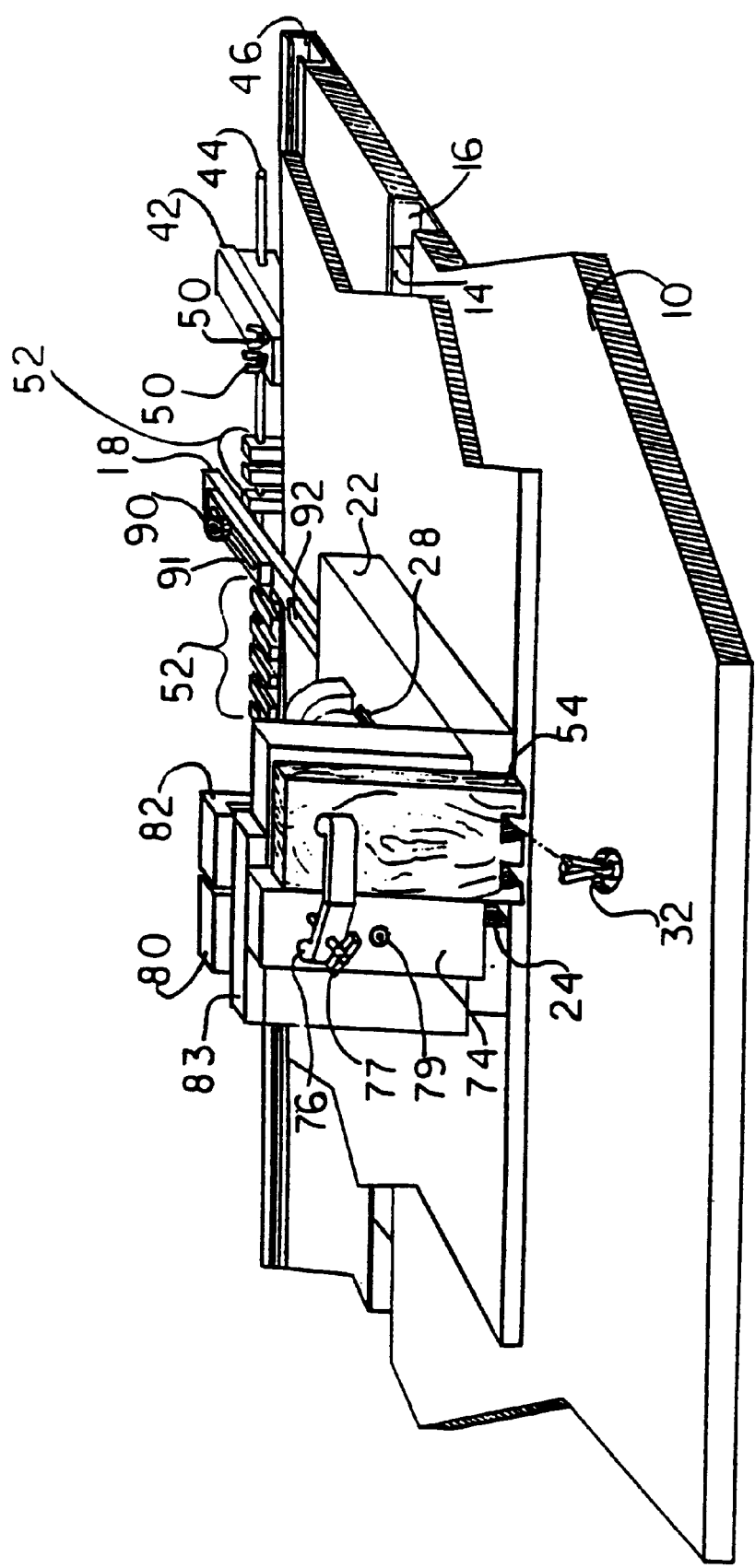
FIG. 4 is a perspective view illustrating the use of the miter slide fence with a workpiece locked in position against the miter slide fence.

Miter slide 22 shown in FIGS. 1, 4, and 7 fits onto the guide bar fence by fitting slot 24 in the miter slide over the guide bar fence and sliding same forward and back. The miter slide holds the workpiece 54 in a vertical position as shown in FIG. 4 and moves it into the cutting tool 32 during the cutting operation. The workpiece 54 is held in place against a miter slide fence 74 by a locking clamp 76.

Miter slide bolt 26, pictured in FIGS. 1, 2, 3, and 7 is permanently mounted on the guide bar fence 18 and protrudes into a bolt access window 28 of the miter slide 22. The miter slide 22 is locked in place by the miter slide locking knob assembly 30 as shown in FIG. 1. The locking knob assembly 30 holds the miter slide on the sliding member and permits it to move the workpiece 54 into and away from the cutting tool 32. When the knob is tightened securely, it locks the miter slide and prevents any further two way movement.

Because this is a two-fence system, the miter slide fence 74 as shown in FIG. 4 and 8, must be lined up with the guide bar fence 18 during the initial set up of the jig system. This is to be sure that the cuts on the pins and their interlocking rails will be in perfect alignment.

The miter slide fence 74 is mounted to the miter slide 22 by bolt 78 and nut 79 and can be adjusted by lateral movement as required. The bolt 78 is tightened to hold the fence in place. The lateral movement and adjustment of the miter slide fence 74 is facilitated by two gauges 80 and 82. As shown in FIG. 4, 7 and 8, these gauges include a first fence positioning gauge 80 and a second fence positioning gauge 82. The second fence positioning gauge 82 slides laterally in either direction and is supported on a guide rail 83. Guide rail 83 is attached to both the first fence positioning gauge 80 and the miter slide fence 74, which allows all three to move in unison when sliding back and forth on top of the miter slide 22. The second fence positioning gauge 82 is secured in place on miter slide 22 with a locking screw and knob 84. The locking screw consists of a hanger bolt which protrudes through the bolt access window 81 and is anchored to the miter slide 22. The knob 84 is tightened to hold the second fence positioning gauge 82 in place.

These gauges, that being first and second 80 and 82 respectively are used to reset the position of the miter slide fence 74 so that joints made in workpiece 54 line up with the placement of joints made in workpiece 20. For instance, if the cuts on the pin and rail are cut properly, the two pieces should fit together with the top and bottom of the drawer pin and rail being flush. However if the pin is higher or lower than the rail as shown in FIG. 19 and 20, this can be corrected through an adjustment of the miter slide fence 74 by realigning of the first and second fence positioning gauges 80 and 82.

The first fence positioning gauge 80 is attached directly to the miter slide fence. The second fence positioning gauge 82 provides a measuring point from which to gauge the new position of the miter slide fence.

Figure 19:
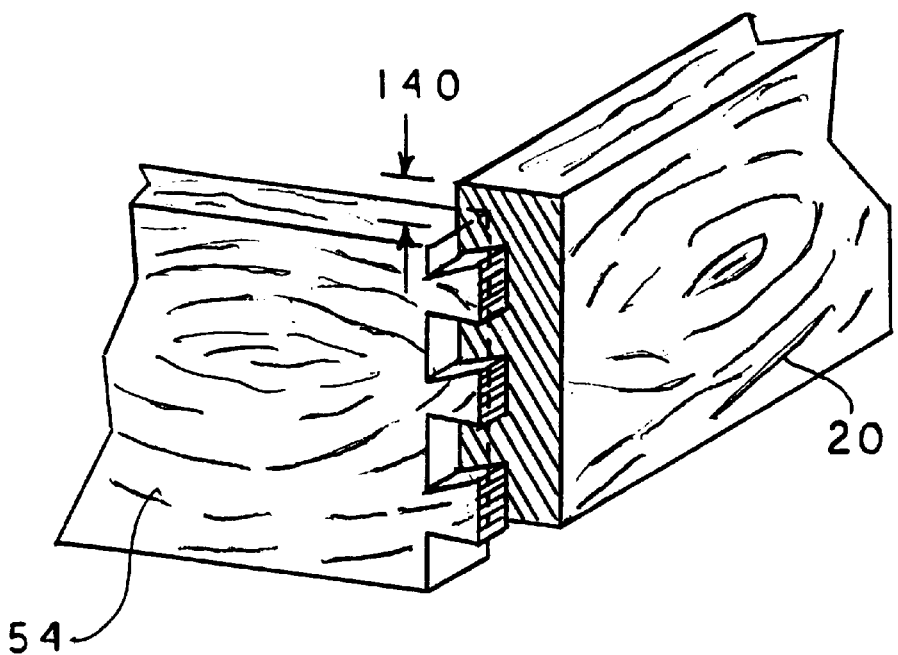
FIG. 19 is an illustration showing misalignment of the pin and rail wherein the pin is higher than the rail.

If the pin 20 is higher than the rail 54 as shown in FIG. 19, the miter slide fence may be moved by loosening the locking bolt 78. The first gauge 80, and the guide rail 83 together with the miter slide fence 74 are moved to increase the first partial cut on the rail 54. In effect, gauge 80 is moved laterally away from gauge 82 a distance equal to the difference between the rail and pin 140. The cutting tool cuts a wider first partial cut in the rail 54 by moving the miter slide fence (with the workpiece attached) away from the original position of the workpiece a distance equal to 140 thereby exposing the fence end of the rail to more of the cutting tool. The miter slide fence 74 is relocked in the new position. The second fence positioning gauge 82 is unlocked by loosening the locking knob 84. The gauge 82 is moved to fit tightly against the repositioned first fence positioning gauge 80 and knob 84 is retightened to hold the gauge in place.

Figure 20:
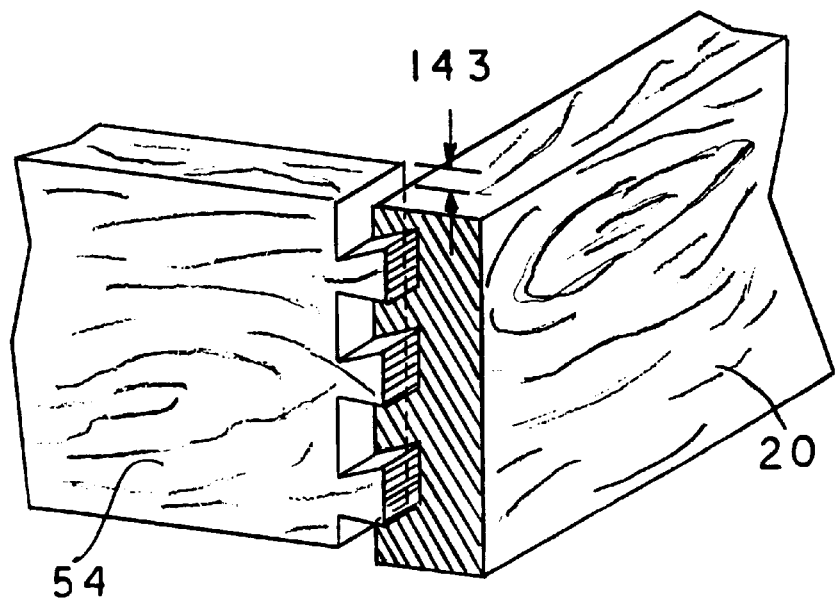
FIG. 20 is an illustration showing misalignment of the pin and rail wherein the pin is lower than the rail.

If the pin 20 is lower than the rail 54 as shown in FIG. 20, the miter slide fence 74 must be moved and knob 84 is loosened. The gauge 82 is moved laterally away from gauge 80 a distance equal to the difference between the rail and pin 143 as a first step to provide a decreased width in the first partial cut on the rail 54. Gauge 82 is relocked in this position. The cutting tool cuts a narrower first partial cut by moving the miter slide fence 74, the attached gauge 80 and the abutting workpiece 54 toward the gauge 82 a distance equal to 143 thereby exposing the fence end of the rail to less of the cutting tool. When the miter slide fence 74 together with its attached first positioning gauge 80 joins the second fence positioning gauge 82, the miter slide fence is locked in this new position by tightening the locking bolt 78.

When using this jig system to make hidden dovetail joints, it is necessary for the dovetail joints, which are cut on the drawer sides (rails), to be rabbeted out on the surface of the rail which when assembled will be positioned on the inside of the drawer (see FIG. 11). This is necessary because the dovetails on the rail 54 are squared off and can not completely fit into the rounded portion of the dovetails on the mating pin 20. If the dovetails are not rabbeted, the resulting intermeshing joint will show an unacceptable telltale rounded cutout 87 on the inside corners of a drawer once it is assembled as shown in FIG. 10.

The dovetails on the rail 54 may be rabbeted out 88 so that the shoulder 89 of the rabbeted dovetail covers the rounded cutout 87 on the pin and hides it from view once the drawer is assembled.

A rabbeted dovetail 88 is accomplished by mounting the miter slide 22 on the guide bar fence 18, as shown in FIG. 4, and securing it in place with locking knob assembly as originally shown in FIG. 1. The workpiece 54 (rail) is mounted on the miter slide 22, and clamped to the miter slide fence 74 with the locking clamp 76 so that the inside surface of the drawer faces the cutter 32.

The router is unplugged and the cutting tool 32 is rotated so that only one of the sharp cutting surfaces reaches out in the direction of the workpiece 54 and is at approximately 90 degrees to the sliding member 12. The miter slide 22 is moved toward the cutting tool 32 until an uncut portion of the workpiece 54 is brought in contact with the cutting tool 32. The miter slide 22 is locked to the sliding member 12 in that position by tightening the knob on the miter slide locking knob assembly 30, which is shown in FIG. 1.

Figure 12:
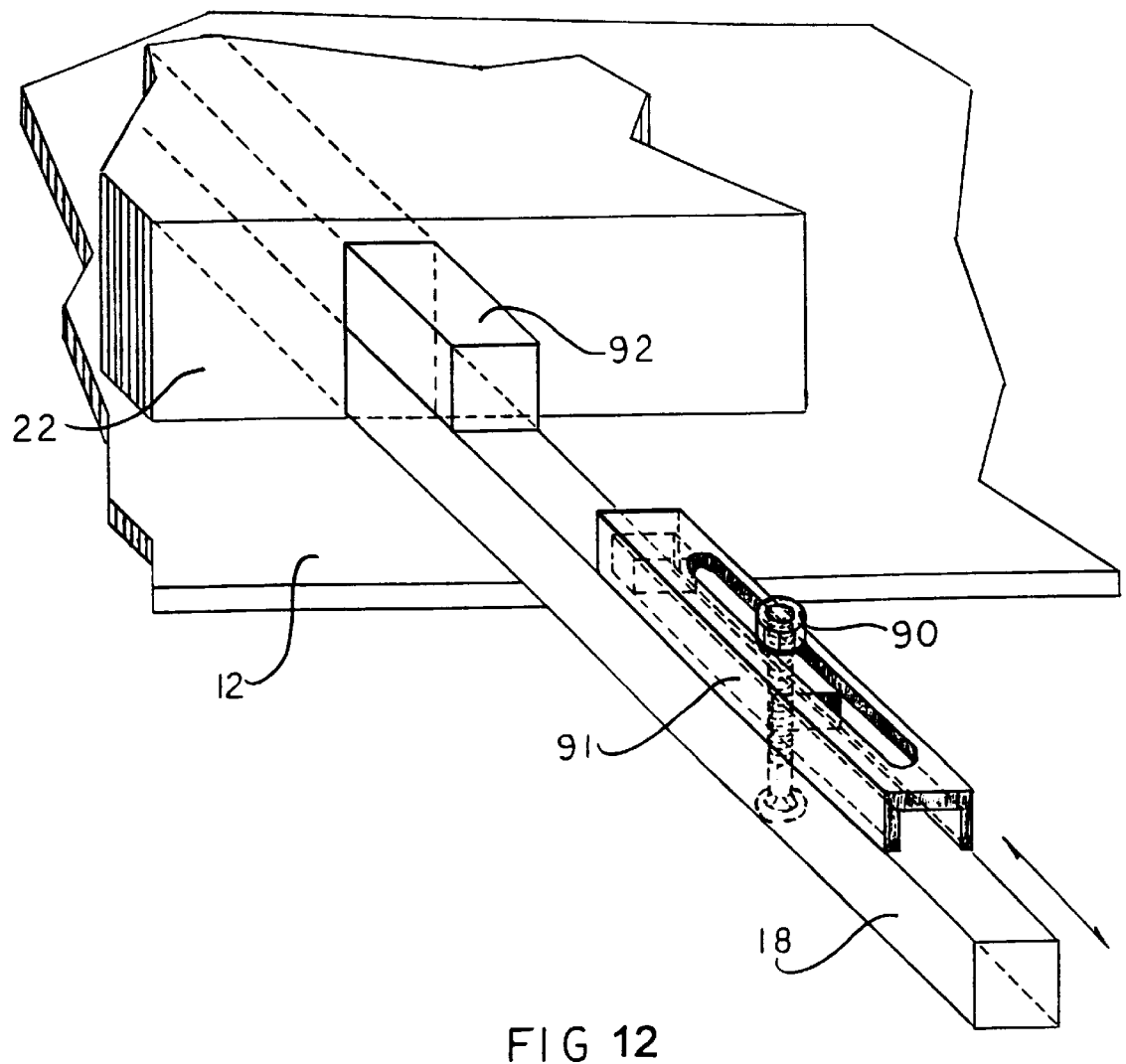
FIG. 12 is a perspective illustration showing the sliding rabbet gauge and the rabbet gauge stop which is used for setting the depth of rabbet cuts on rails.

The depth of the rabbet cut is determined by setting the sliding rabbet gauge 91 pictured in FIGS. 1,2,3, and 12. FIG. 12 shows the details of the sliding rabbet gauge 91 and the rabbet gauge stop 92. First all spacers 52 must be dropped so that the sliding member 12 can be moved laterally in either direction without restrictions. The locked miter slide 22 carrying the workpiece 54 is moved laterally until the workpiece 54 is clear of the cutting tool 32. The sliding rabbet gauge locking knob 90 is released and the sliding rabbet gauge 91 is moved toward the miter slide 22 until it contacts the rabbet gauge stop 92 on the miter slide 22. The sliding rabbet gauge knob 90 is tightened, locking the sliding rabbet gauge 91 in position. The miter slide 22 is unlocked by loosening the locking knob 30. It is moved in the direction of the cutting tool 32 until the distance between the rabbet gauge stop 92 and the sliding rabbet gauge 91 equals the desired depth of the rabbet cut. The miter slide 22 is then locked in this position by tightening the locking knob 30. The cutting tool is turned on and the sliding member is laterally moved and workpiece 54 is moved through the cutting tool making the rabbet cut.

Figure 17:
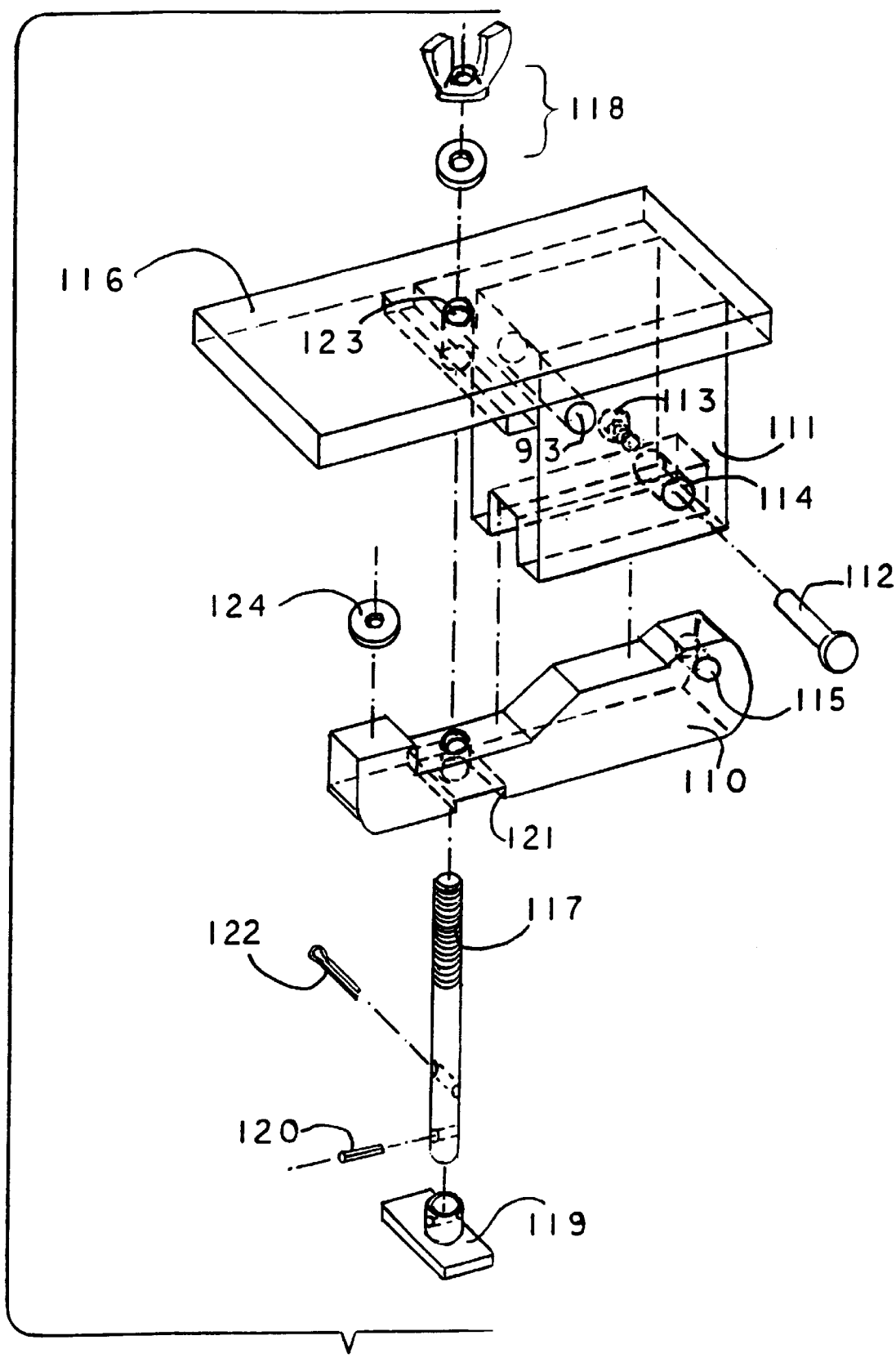
FIG. 17 is an exploded view illustrating another type of spacer bar cantilever which clamps to a router table.

FIG. 17 shows an alternate means for holding the spacer bar 44 to a router table where a "T" slide 46 is not available. Two identical cantilevers are required in this situation. A clamping jaw 110 is recessed into the base of the alternative cantilever 111 and is held in place by pivot pin 112 and its locking screw 113. Pivot pin 112 passes through hole 114 in the cantilever base and hole 115 in the clamping jaw 110 providing a hinge for clamping jaw 110.

The clamping jaw compresses the router table between the clamping jaw 110 and the top of the cantilever 116.

Threaded pin 117 passes through a hole in the clamping jaw 110 and through a hole 123 in the top of the cantilever 116 where it is secured by washer and wing nut 118. A "T" fastener 119 fits over the bottom of the threaded pin 117 and is secured to the pin by roll pin 120. The "T" fastener 119 fits into a slot 121 in the underside of the clamping jaw 110 and secures the threaded pin 117 from twisting. A cotter pin 122 prevents the threaded pin 117 from falling out of the clamping jaw. Spacer bar 44 is held on the cantilever when it is placed through the hole 93 in the cantilever base.

Figure 21:
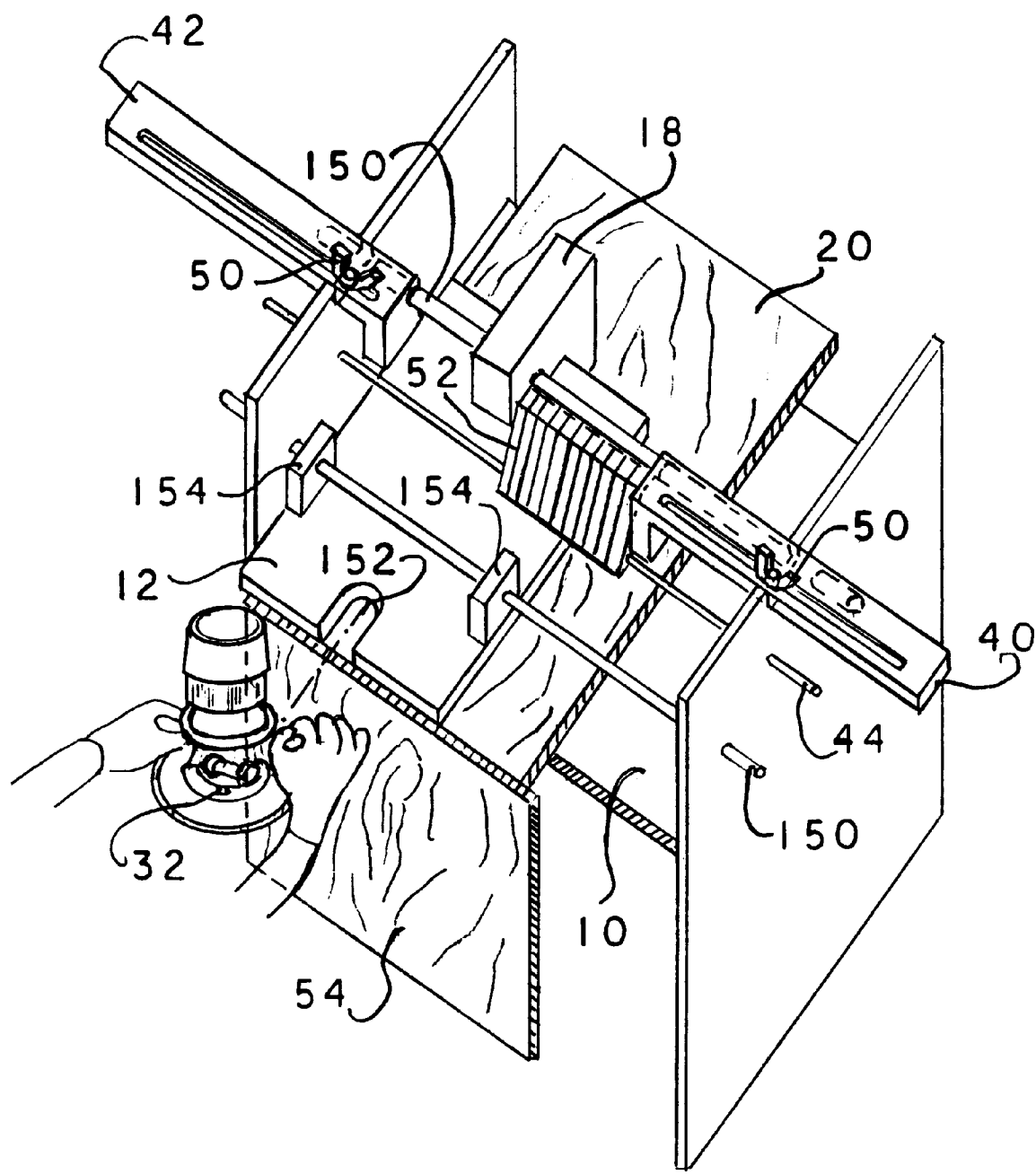
FIG. 21 is a perspective view of an alternative setup for the jig system used with a portable router wherein the spacer bar is removably attached to the support structure of stationary fixture.
Figure 22:
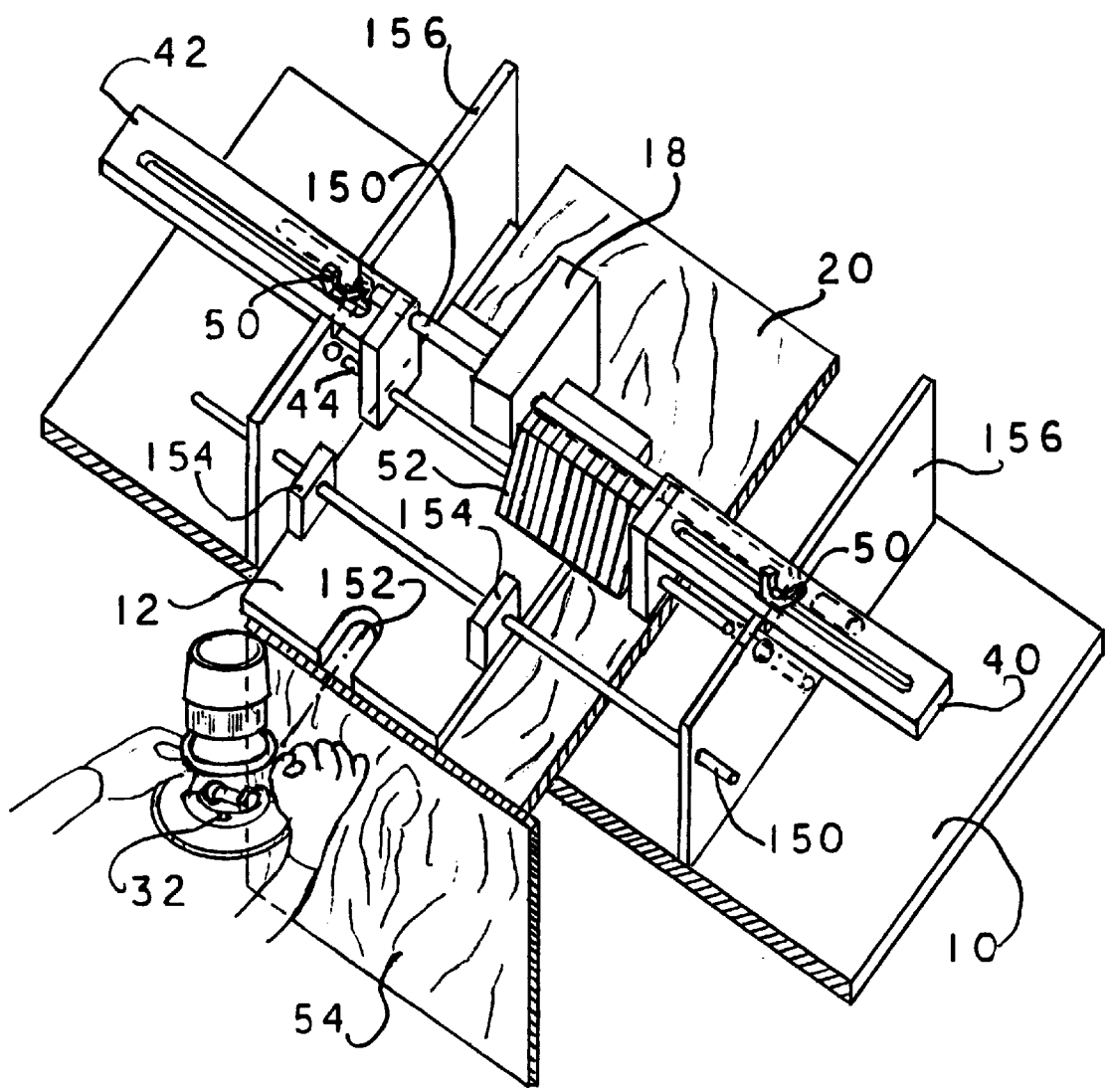
FIG. 22 is a perspective view of an alternative setup for the jig system used with a portable router wherein a cantilever holds the spacer bar.

In another preferred embodiment the jig system utilizes a cutting tool 32 that is attached to a portable router. Both FIGS. 21 and 22 show different embodiments for securing the jig system to a stationary fixture 10. In FIG. 22 the stationary fixture 10 may be a workbench or any flat surface that provides a stable area for clamping a workpiece thereto. In this embodiment the stationary fixture further comprises a series of bridging supports 150 attached to side braces 156 which are secured to the stationary fixture 10. It should be noted that any configuration of a support system that can be securely attached to the stationary fixture 10 is applicable in this jig system. The bridging supports 150 span across the workpiece and further support the sliding member 12. Sliding member 12 is positioned above the workpiece and moves laterally on at least one of the bridge supports 150. The sliding member comprises at least one means for suspending the sliding member 12 from the bridging supports 150. In this embodiment, it is preferred that at least one suspension ear 154 which is secured to the sliding member provides the means for the sliding member 12 to move laterally across the bridging supports 150.

The bridging supports 150 and side braces 156 can be adjusted for different thicknesses of wood stock by vertical adjustment of the side braces. In the event the side braces of the bridging support system are not adjustable, then it is envisioned by this inventor that the means for suspension may be adjustable to accommodate different thicknesses of stock.

Attached to the sliding member 12 is an extension member 18. The extension member 18 is permanently fastened to the sliding member 12. It provides at least one surface that contacts at least one engaged spacer 52 for positioning the sliding member over the workpiece for each cut with the portable cutting tool 32. When the sliding member moves laterally on the bridging supports, the extension member also moves and this facilitates contact with at least one engaged spacer. In FIGS. 21 and 22, extension member 18 is shown as a block that rises above sliding member 12 to engage with the spacers.

Figure 24:
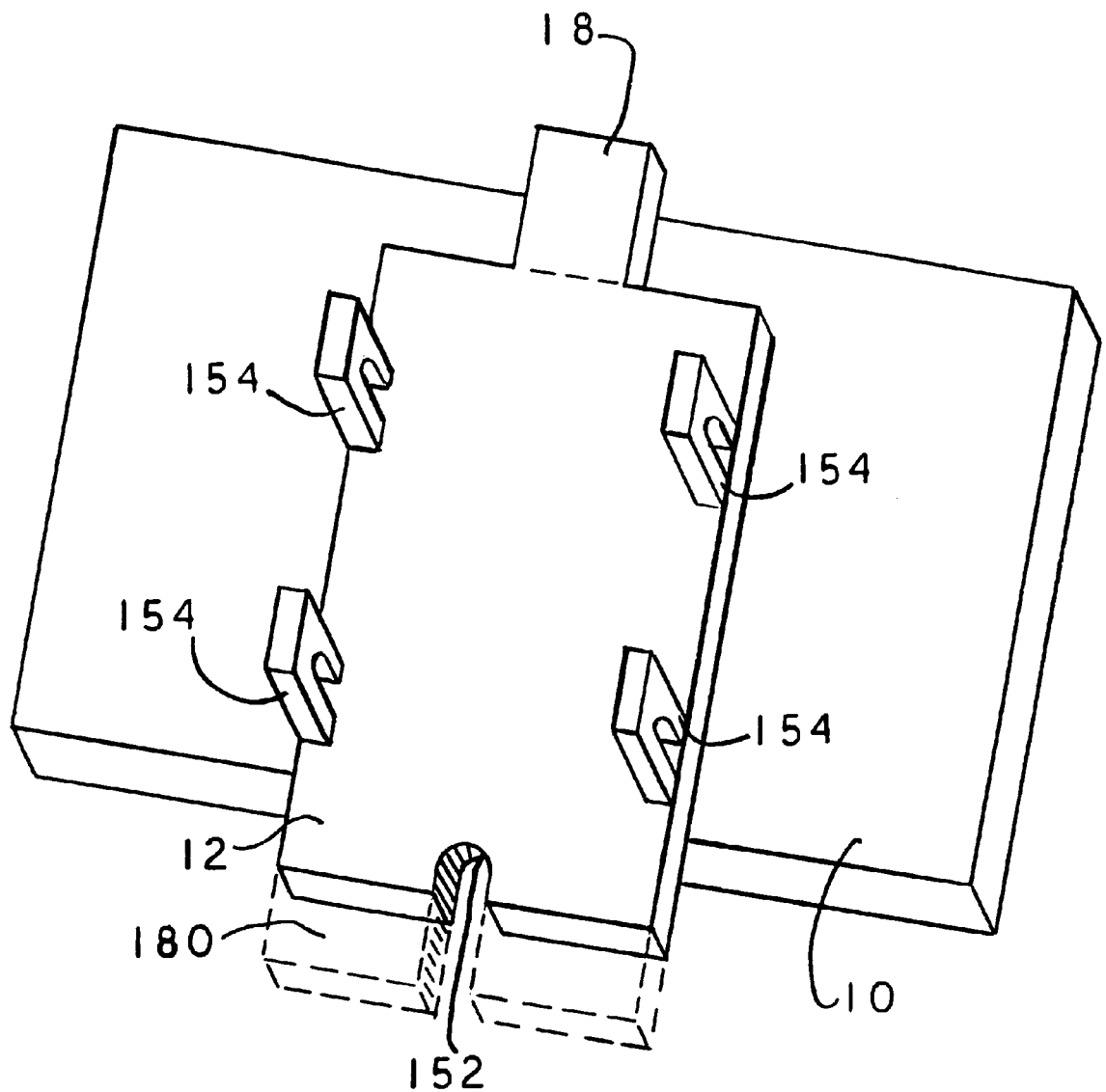
FIG. 24 is an alternative embodiment of a sliding member positioned above a workpiece.

As an alternative, it should be noted that sliding member 12 can have a tab-like extension member 18, as shown in FIG. 24, which is flush with the surface of the sliding member and extends a sufficient distance to contact at least one engaged spacer. In this embodiment, the extension member is parallel to the longitudinal axis of the sliding member The sliding member may further comprise a recess 152 for accepting a cutting tool 32. The recess acts as a docking space for receiving the cutting tool for each joint cut. The recess may be adjustable to accept different sizes of cutting tools. Sliding member 12 in FIG. 22 is shown at a length not exceeding the front edge of the work piece, but it should be understood that the length of the sliding member may be extended beyond the workpiece a sufficient distance to allow the portable router to rest on an extension 180 of the sliding member as shown in FIG. 24. This additional length allows the user to rest the router on the sliding member without turning off the router. If the length of the sliding member is increased the depth of the recess 152 or length of path to the edge of the work piece will also be increased thereby allowing the router to move through the addition distance to the workpiece.

Extension member 18 is transverse to a spacer bar 44, and preferably, perpendicular to the spacer bar. The spacer bar 44, as shown in FIGS. 21 and 22 engages with and holds a plurality of spacers 52. The spacers 52 may be adjustable as shown in FIG. 5 and 26 or non-adjustable as shown in FIG. 15. It should be noted that the row of contacting individual spacers controls the lateral movement of the sliding member 12. When the spacers 52 are positioned in an engaged working position, they engage with the extension member 18 thereby preventing any further movement of the sliding member 12. The sliding member 12 is correctly positioned over the workpiece as the portable cutting tool is moved into the workpiece at the exact placement of the next cut.

Both workpieces 20 and 54 may be cut at the same time if one of the workpieces is offset from the other a distance equal to ½ the center to center distance between joints. After each cut is made, the spacer closest to the extension member is disengaged by dropping out of position thereby allowing the sliding member with the attached extension member to move into position for engaging with the next spacer.

The spacer bar 44, as shown in FIG. 22, may be held and secured by means for holding the spacer bar which includes clamping cantilevers that hold the spacer bar 44 and connect it to the stationary fixture 10 through side braces 156. Cantilevers 40 and 42 are secured to the stationary fixture through side braces 156 and are used to hold the spacer bar while simultaneously engaging with at least one of the spacers 52 in the working mode. Cantilevers 40 and 42 are laterally movable on the spacer bar thereby providing for firm contact of the spacers against the extension member 18 when the spacers are in an engaged working mode. An advantage of the cantilevers engaging with at least one spacer and holding the plurality of spacers in a stable and vertical position is the reduction of lateral movement of the spacers. As such, the present system provides greater accuracy in positioning and cutting of joints, in that, pressure applied on the sliding member and extension member by the entering cutting tool will not cause lateral movement in the spacers which could cause inaccuracy in the size and fit of the joints.

FIG. 21 is an alternative setup of the present jig system used with a portable cutting tool. In this setup the spacer bar 44 is removably attached to the side braces of the stationary fixture and not secured by cantilevers 40 and 42. Spacer bar 44 can be removed to place the required number of spacers 52 on the spacer bar and then reinserted into the side braces. The bar is positioned near to a bridging support 150 to allow the spacers to rest against it while in the engaged working mode. Cantilevers 40 and 42 move laterally on one of the bridging supports 150 and thereby provide for firm contact of the spacers against the extension member 18 when the spacers are in an engaged working mode.

The stationary fixture 10 may include a fence member that can be used to position the workpiece 20 thereagainst. Additionally, means of applying adjustable lateral tension and/or pressure to the extension member may be secured to the stationary fixture. The means for applying tension and/or pressure is connected to the extension member thereby producing a force that maintains close contact of the extension member to the contacting spacers in the engaged working mode. Generally, means for applying tension may include a spring mechanism, while means for applying pressure may include a spring-loaded bracket, both of which are positioned between the extension member and stationary fixture.

When cutting the rails of a drawer, workpiece 54 must be secured at a 90 degree angle from the placement of the pin 20 workpiece. Accordingly, workpiece 54 is secured vertically below the sliding member and the cutting tool is introduced into the recess on the sliding member. As an alternative, the pin 20 and rail 54 may be positioned at right angles from each other, offset and secured to a surface of the stationary fixture to be cut simultaneously.

Figure 23:
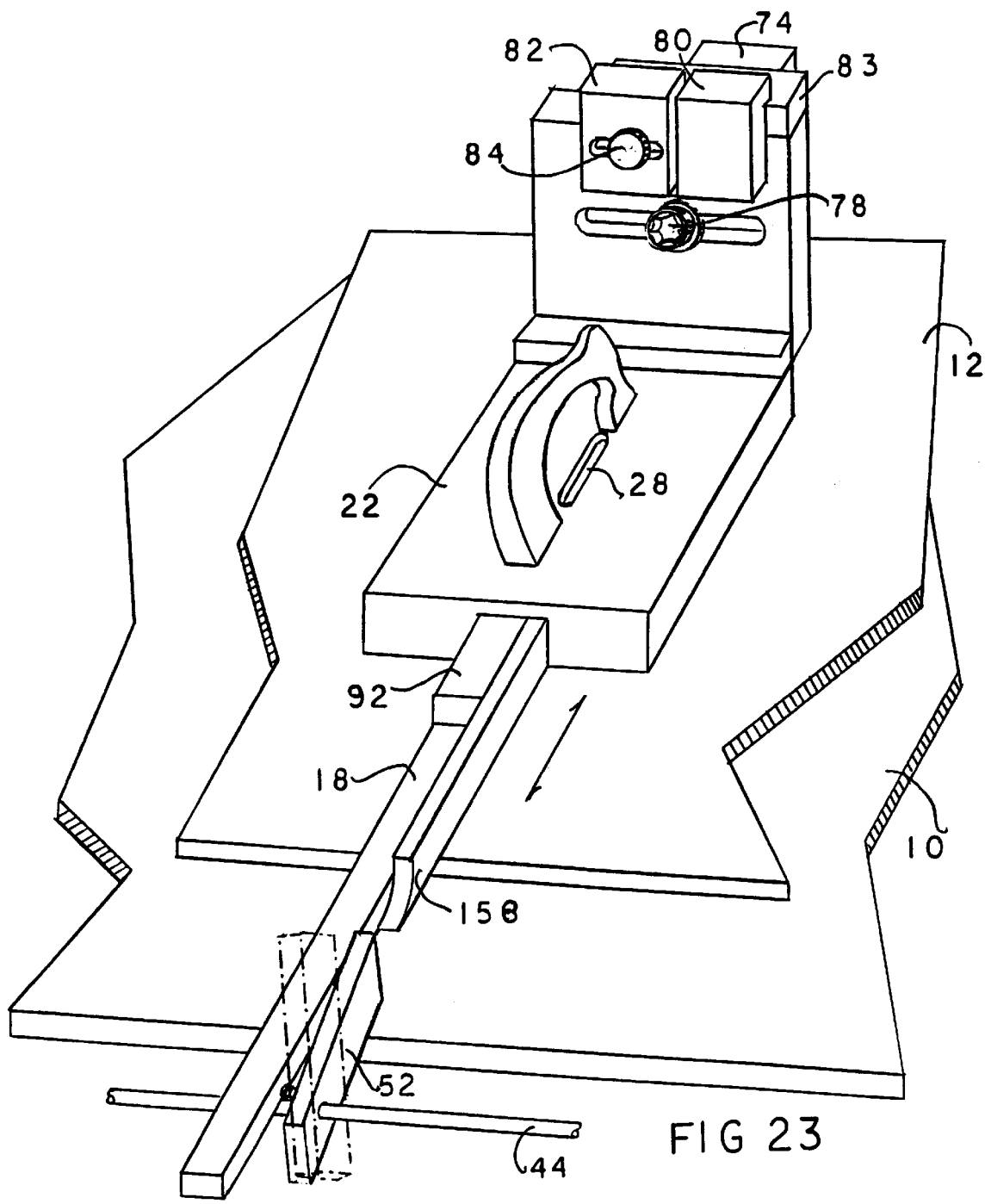
FIG. 23 is an illustration showing an adaptation to the miter slide used for automatically disengaging spacers from a working mode to non-working mode.

It is envisioned by this inventor that the spacers 52 may be automatically disengaged after each cut on the workpiece by mechanical means, a spring loaded device, electrical signal, or any other mechanism that facilitates the automatic rotation or pivoting of a spacer from a working mode to a non-working mode. Merely as an example, FIG. 23 illustrates a possible setup for automatic disengagement of a spacer after a joint has been cut. Miter slide 22 is modified by securing a lifter bar 158 to the rabbet stop gauge 92 of the miter slide. In the process of cutting a rail, the miter slide moves on extension member 18 into the cutting tool while the end portion of extension member engages with the spacer 52 and acts as a force that compresses and firmly holds the spacers against a cantilever. After the cut is made the miter slide moves away from the cutting tool and with this movement lifter bar 158, having a curved edge surface, lifts the spacer off the stationary structure 10 and rotates same to drop out of position for disengagement. The miter slide 22 is moved towards the cutter a sufficient distance for the lifter bar 158 to clear the next spacer and then the miter slide 22 along with extension member 18 and sliding member 12 are moved laterally and extension 18 engages the next spacer thereby positioning the workpiece for making the next cut.

Figure 25:
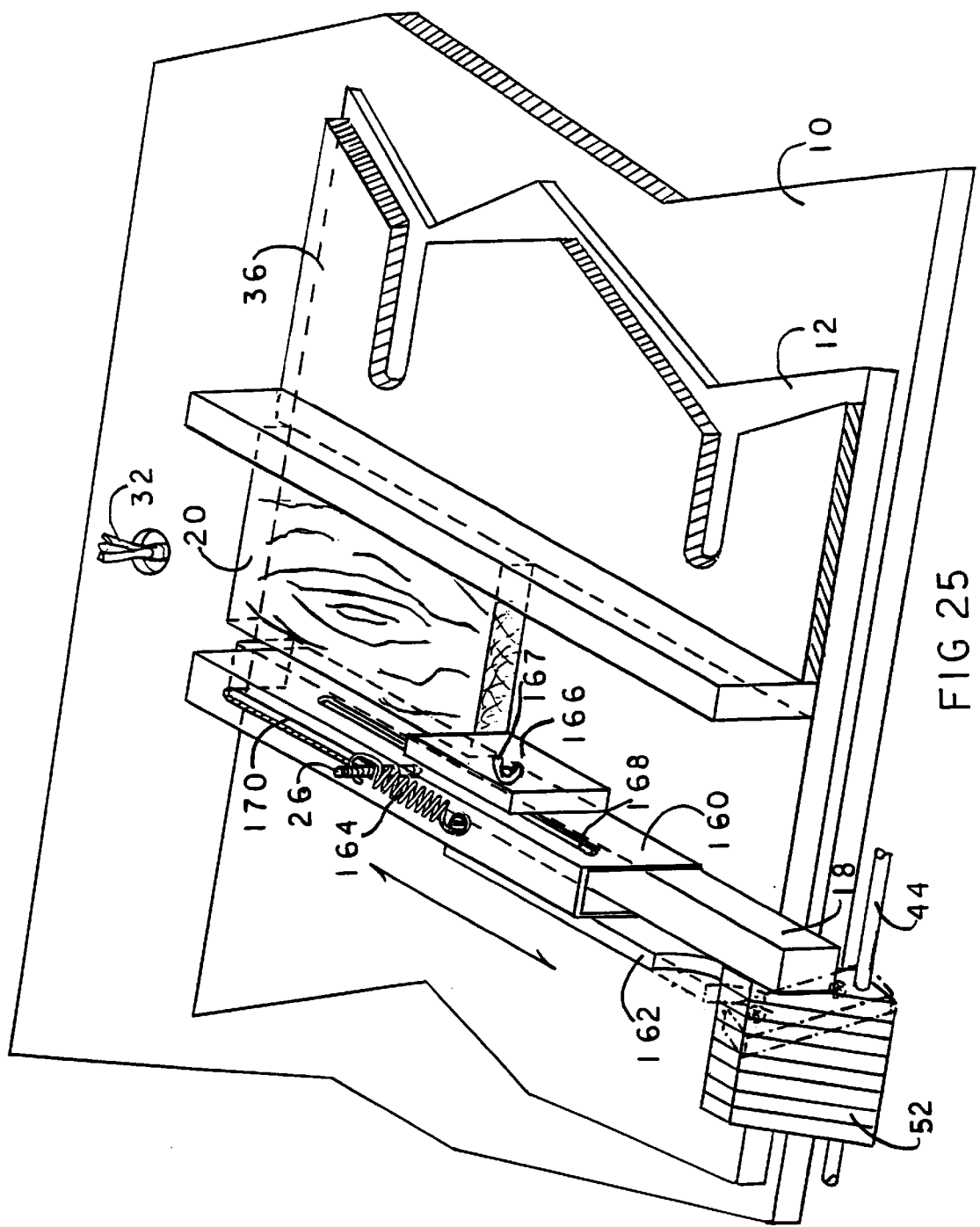
FIG. 25 is a perspective view showing an adaptation to the guide bar fence used for automatically disengaging spacers from a working mode to non-working mode.

When making cuts on the pin 20 workpiece, a sliding rider 160 that slides on extension member 18 may be utilized to automatically disengage spacers from a working mode to a non-working mode as shown in FIG. 25. The sliding rider 160 fits over and is adapted to slide on the guide bar fence 18. The movement of the sliding rider is into and away from the cutting tool 32 which is the same movement the workpiece 20 makes when being introduced to the cutting tool for each joint cut. The sliding rider 160 uses a stop block 166 for butting against the end of the workpiece 20 for connecting the workpiece to the sliding rider. This allows the rearward movement in the workpiece 20 to be transferred to the sliding rider 160. The stop block system comprises a movable rear stopping block 166 and a recessed grove 168 that is positioned along the longitudinal axis on both sides of the sliding rider 160. The rear stopping block is adjustable and moves in grove 168. It is locked in place by a "T" bolt protruding through grove 168 and a wing nut 167. On the opposite side of the sliding rider is a lifter bar 162 which is positioned and movable in the grove 168 recessed on the opposite side. One end of the lifter bar 162 has a curvature edge to facilitate the lifting of spacers and is positioned to contact the closest spacer engaging with the guide bar fence. Lifter bar 162 is secured to the grove 168 by a "T" bolt and wing nut 167 (not shown). When the workpiece 20 is moved into the cutting tool 32, the sliding rider 160 is pulled forward toward the cutting tool by spring 164 which attaches to miter slide bolt 26 which protrudes through channel 170. The return motion away from the cutting tool facilitates the contact of lifter bar 162 to the spacer that is currently engaging with the guide bar fence. This spacer is lifted and rotated or pivoted out of the working mode position by the lifting bar 162. This disengagement of the spacer allows the extension member and sliding member 12 to be moved laterally to engage with the next spacer thereby positioning the workpiece for the next joint cut. The lifter bar 162 and rear stopping block 166 can be moved on either side of the sliding rider to allow for joint cutting on both sides of the guide bar fence.

For other and more particular details concerning the practice of this invention and the advantages thereof, reference is made to the following example.

EXAMPLE

The method of using the jig system of the present invention with a stationary cutting tool stabilized in a router table is best illustrated by the following example explaining the steps for cutting a hidden or half-blind dovetail joint on a pin workpiece 20 and a through dovetail joint on the rail workpiece 54.

Hidden dovetails are used on drawers where the drawer front (pin), when in the closed position, shows no evidence that the drawer was made using dovetail joints. When the drawer is opened, the dovetail joints are visible, but only on the drawer sides.

At least the drawer fronts (pins) are thicker than the drawer sides (rails) and this additional thickness hides the dovetails from frontal view.

For hidden dovetail joints, the depth of cut is set so that the top of the dovetail cutter is even with the top most surface of a drawer rail when a rail is laid flat on the surface of the sliding member. To accomplish this, the router was unplugged, the drawer rail was moved, side face up, to the cutter so that a measurement or visual sighting could be made. In cutting the hidden dovetails this measurement needed only to be visually accurate.

When making hidden dovetails, the rail 54 was positioned on the miter slide as shown in FIG. 4 and moved into the cutting tool. The pin 20 was positioned horizontally on the sliding member 12 as shown in FIGS. 2 and 3 and moved into the cutting tool.

One end of a pin was cut on one side of the guide bar fence 18 and the other end of the same pin was cut on the opposing side of the guide bar. During the operation the surface of the workpiece 20, which represents the outside of the drawer, was always facing up. The edge surface which contacted the guide bar was lightly marked with the word "Fence." The vice jaw 34 pressed the workpiece 20 against the guide bar 18 and locking screws 38 were tightened to hold the workpiece from moving laterally during cutting.

Before making a production cut, the adjustable spacers 52 were set to the proper thickness, that being the center to center distance between joints. This was accomplished by making a few random test cuts into the end of a scrap pin and the test cuts were measured precisely. It goes without saying that the scrap "pin" used for this operation was thicker than the cutter height.

In making the test cut, the sliding member was held very securely as the test pin was pushed into the cutter. The purpose of this cut was to determine accurate measurements of two places on each cut.

The first measurement was the diameter of the cutting tool 32 and the second measurement was the width of the opening of the cut on the end of the workpiece which depended on the depth of the cut into the workpiece and the angle of the cutting tool. In this regard, the deeper the cut into the pin the smaller the second measurement. The first and second measurements were added and this value determined the width of the spacers. (Note: in a dovetail joint, the deeper the cut, the thinner will be the spacer.)

The spacers were adjusted to the appropriate size according to the procedure discussed earlier. After setting the spacers, they were mounted on the spacer bar 44 and the spacer bar was mounted within the cantilevers 40 and 42 as shown in FIG. 2.

Next the sliding member 12 was centered on the centering cursor. The sliding member 12 was moved so that the centering curser 57 lined up precisely with the mark 58 on the router table 10 and the sliding member was held in this position. The spacers were placed in the engaged working mode on the one side of the guide bar fence 18. The locking knobs 50 were loosened on cantilever 40 and it was moved to compress the spacers between the cantilever and the guide bar. A check was made to be sure the centering curser 57 lined up and all the spacers were in line. The two locking knobs 50 were locked on the cantilever 40. The sliding member 12 was moved until it was stopped as the spacers were compressed between the guide bar fence 18 and cantilever 40.

The spacers were dropped to the down position and moved over to the other side of the guide bar. The spacers were placed in the engaged working mode and the above process was repeated and the spacers 52 were compressed between cantilever 42 and the guide bar fence 18. At this point the centering curser was lined up perfectly on the guide line 58 drawn on the router table or stationary fixture.

It was necessary to determine how far the workpiece 20 pin should be pushed into the cutter 32 when making the dovetail cuts. This distance was equal to the thickness of the rail and the adjustable back stop was set as illustrated in FIGS. 2, 3, and 6.

The router was unplugged and the cutting tool was manually rotated so that one of the cutting surfaces was at right angles to the sliding member 12. The two back stops 62 an 64 were mounted on the router table fence on either side of the cutting tool 32 and equidistant therefrom. The spring loaded plungers 70 on the back stops were unlocked and allowed to slowly extend to the maximum extension. To adjust the back stops, a piece of wood wide enough to span both back stop plungers was used. The piece of wood was clamped between the guide bar fence 18 and vice jaw 34 so that the forward most side of the piece of wood contacted the cutter blade. The router table fence 66 was maneuvered so that the tips of the spring loaded plungers either touched the piece of wood securely or at least were in reasonable contact with some compression on their springs. The router table fence 66 was locked in place. The back stop plungers 70 were pushed all the way back into their holders and locked into place. Now, a rail 54 was placed flush against the piece of wood that was clamped between the guide bar fence and the vice jaw and the plungers were allowed to extend forward to contact the rail. The plunger was locked in this position by turning locking knob 73. Both back stops were set in this manner.

The cutting of the workpiece 20 was accomplished by the setup shown in FIGS. 2 and 3. All the spacers were placed on one side of the guide bar fence 18 in the engaged working mode. A workpiece (pin) 20 was placed on the sliding member 12 touching the guide bar fence 18 and "fence" was marked on the edge of the pin touching the guide bar. The word "up" was marked on the face of the pin that faced up to be sure this side also faced up when the opposite end was cut on the other side of the guide bar. The workpiece was secured with vice jaw 34. The router was started and the first spacer was dropped, that being the one closest to guide bar. The slack was taken up by moving the sliding member 12 laterally until it stopped. With pressure that kept the sliding member and the attached guide bar fence snug against spacers, the workpiece pin was moved forward into the cutter 32 until the workpiece's forward motion was stopped as it contacted the plungers 70 of the back stops. The pin was backed off from the cutter. The next spacer in line was dropped down and the sliding member was moved laterally over to make contact with the next spacer. While exerting pressure to keep the guide bar in contact with the rest of the spacers, the workpiece pin was moved forward again to make the next cut. The process was repeated until all cuts were made. The opposite end of the pin was cut on the other side of the guide bar fence as shown in FIG. 3. The spacers were moved to the other side of the guide bar fence and the same procedure as described above was performed.

All rail cuts were made using a miter slide 22. The spacers were positioned on the same side of the guide bar fence as both ends of the rail were cut.

The miter slide 22 was mounted on the guide bar fence 18 as shown in FIG. 4. A workpiece 54(rail) was placed in the miter slide 22 and locked into place. The back stops were removed from the router fence for this operation. The spacers were placed on one side of the guide bar fence in the engaged working position. The router was turned on. The handle on the miter slide was grasped and the miter slide was moved forward slowly into the cutter. A downward pressure was maintained so that the rail did not ride up on the cutter. The same downward and sideways pressure was maintained as the miter slide was moved back and clear of the cutter.

The spacer that was in contact with the guide bar was dropped down, the sliding member was moved over to take up the slack and the next cut was made. This was done until all the cuts were made. The rail was flipped over and the spacers were again placed in the engaged working mode and the cutting of the joint proceeded as before.

The dovetails on the rails did not fit completely into the pin at this time because a portion of the rail protruded. To resolve this a rabbet cut 88 was made on the side of the rail which forms the inside of a drawer as shown in FIG. 11.

The dovetailed rail was mounted in the miter slide with the side marked "fence" against the fence on the miter slide and the inside surface of the finished drawer faced the cutter. The cutting bit was rotated so that the cutting area was at right angles to the sliding member. The miter slide was moved forward until the rail contacted the cutting edge of the router bit. As shown in FIG. 12, the sliding rabbet gauge 91 was moved so that it contacted the rabbet stop 92 on the miter slide and the sliding rabbet gauge 91 was locked in this position by tightening the locking knob 90. All the spacers were dropped to the down position and the sliding member was moved laterally until the rail was clear of the cutter.

The miter slide 22 was moved forward a distance equal to the rabbet depth measurement. The forward edge of the locked sliding rabbet gauge 91 was used as a point from which to measure. The knob on the miter slide was unlocked. The miter slide was moved forward so that the distance between the sliding rabbet gauge 91 and the rabbet gauge stop 92 equaled the rabbet depth measurement. A dial caliper was used to make this accurate measurement and the miter slide was locked in this position. The router was turned on and the sliding member was moved laterally into the cutter and the rabbet was cut in the rail.

The pin and rail were joined together and required only a very light tapping to secure them in place.

What is claimed is:

1. A jig system comprising;
   a) a stationary fixture;
   b) a spacer bar;
   c) a plurality of spacers connecting to the spacer bar, the spacers are adapted for lateral and rotational movement along the spacer bar for positioning the spacers in an engaged and non-engaged working mode;
   d) a sliding member for engaging with the stationary fixture comprising:
      i) means for moving the sliding member laterally on the stationary fixture; and
      ii) means for contacting at least one of the spacers during the engaged working mode; and
   e) means for holding and for connecting the spacer bar to the stationary fixture while engaging at least one of the spacers in the engaged working mode.

2. The jig system according to claim 1 wherein the means for contacting at least one of the spacers during the engaged working mode of the sliding member is a guide bar fence having opposing work receiving surfaces for guiding the workpiece thereagainst.

3. The jig system according to claim 1 wherein means for moving the sliding member laterally on the stationary fixture is a member selected from the group consisting of suspension ears secured to the sliding member for engaging with the stationary fixture and a support runner secured to the sliding member for engaging with the stationary fixture.

4. The jig system according to claim 1 wherein the spacers are adjustable.

5. The jig system according to claim 1 wherein the means for holding is laterally movable on the spacer bar and the stationary fixture.

6. The jig system according to claim 1 wherein the means for holding is a member selected from the group consisting of a cantilever and a clamp.

7. The jig system according to claim 2 wherein the guide bar fence is positioned perpendicular to the spacer bar.

8. The jig system according to claim 1 wherein the sliding member further comprises at least one movable vice jaw for securing the workpiece against the extension member.

9. The jig system according to claim 2 wherein the guide bar fence supports a miter slide.

10. The jig system according to claim 1 further comprising at least one adjustable stop block affixed to the stationary fixture and positioned perpendicular to the longitudinal axis of the sliding member.

11. The jig system according to claim 2 wherein at least one means for holding the spacer bar is positioned such that the plurality of contacting spacers in the engaged working mode can be positioned and compressed between the guide bar fence and the means for holding.

12. The jig system according to claim 1 wherein the workpiece is supported on the sliding member.

13. The jig system according to claim 1 wherein the spacers are automatically disengaged after each cut on the workpiece such that the next engaged spacer is presented.

14. A jig system for guiding the placement of multiple cuts in a workpiece, the jig system comprising:
    a) a stationary fixture
    b) a spacer bar;
    c) a plurality of spacers connecting with the spacer bar, the spacers adapted for lateral and rotational movement along the spacer bar thereby providing an engaged and non-engaged working mode for the spacers;
    d) a sliding member comprising:
       i) means for moving the sliding member laterally on the stationary fixture;and
       ii) means for contacting at least one of the spacers during the engaged working mode; and
    e) holding means for holding the plurality of spacers against the sliding member while engaging at least one of the spacers in the engaged working mode.

15. The jig system according to claim 14 wherein the means for holding the plurality of spacers in an engaged working mode holds the spacer bar and attaches to the stationary fixture.

16. The jig system according to claim 14 wherein the sliding member is positioned above a workpiece.

17. The jig system according to claim 14 wherein the sliding member further comprises a recess for accepting the cutting tool.

18. The jig system according to claim 14 wherein the plurality of spacers in the engaged working mode are contacting each other.

19. The jig system according to claim 14 wherein the stationary fixture further comprises at least one bridging support.

20. The jig system according to claim 19 wherein the sliding member is suspended from at least one bridging support by the means for moving the sliding member laterally on the stationary fixture.

21. The jig system according to claim 14 wherein the spacer bar is removably attached to the stationary fixture.

22. The jig system according to claim 14 wherein the spacers are non-adjustable.

23. The jig system according to claim 14 wherein the means for contacting at least one of the spacers during the engaged working mode is a tab-like extension extending from the sliding member.

* * * * *